(12) United States Patent
Walti et al.

(10) Patent No.: US 10,373,230 B2
(45) Date of Patent: Aug. 6, 2019

(54) COMPUTER-IMPLEMENTED METHOD FOR RECOMMENDATION SYSTEM INPUT MANAGEMENT

(71) Applicant: Raise Marketplace Inc., Chicago, IL (US)

(72) Inventors: Christopher Walti, Chicago, IL (US); Tyler Robert Spalding, Chicago, IL (US); Brian Philip Hawkins, San Diego, CA (US)

(73) Assignee: RAISE MARKETPLACE, LLC, Chicago, IL (US)

( * ) Notice: Subject to any disclaimer, the term of this patent is extended or adjusted under 35 U.S.C. 154(b) by 924 days.

(21) Appl. No.: 14/433,624

(22) PCT Filed: Oct. 7, 2013

(86) PCT No.: PCT/IB2013/003030
§ 371 (c)(1),
(2) Date: Apr. 3, 2015

(87) PCT Pub. No.: WO2014/083429
PCT Pub. Date: Jun. 5, 2014

(65) Prior Publication Data
US 2015/0262282 A1    Sep. 17, 2015

Related U.S. Application Data

(60) Provisional application No. 61/710,564, filed on Oct. 5, 2012.

(51) Int. Cl.
*G06Q 30/00* (2012.01)
*G06Q 30/06* (2012.01)

(52) U.S. Cl.
CPC ..... *G06Q 30/0631* (2013.01); *G06Q 30/0643* (2013.01)

(58) Field of Classification Search
CPC ............... G06Q 30/0631; G06Q 30/0643
See application file for complete search history.

(56) References Cited

U.S. PATENT DOCUMENTS

2008/0209350 A1*  8/2008  Sobotka ............... G06F 3/0482
                                                         715/762
2009/0018926 A1    1/2009  Buehlman
(Continued)

OTHER PUBLICATIONS

Zha, Zheng-Jun, et al. "Visual query suggestion." Proceedings of the 17th ACM international conference on Multimedia. ACM, 2009 . (Year: 2009).*
(Continued)

*Primary Examiner* — Matthew E Zimmerman
(74) *Attorney, Agent, or Firm* — Garlick & Markison; Timothy W. Markison

(57) ABSTRACT

A user-centric computer-implemented method and system for managing inputs and creating, modifying, importing, and sharing one or more user lifestyle preference profiles as input into a relevance assessment engine to determine a user's product or service preferences comprises a personalized recommendation software for assessing and aggregating lifestyle items via style dimension mapping of one or more computer-implemented algorithms to process image-associated metadata to create unique vector inputs, individualized lifestyle preference indices, and lifestyle preference outputs, associated with a plurality of correlated products, services and experiences. The recommendation system then directly matches each user to discrete relevant items without the need for management of historical data from other users.

14 Claims, 36 Drawing Sheets

(56) References Cited

U.S. PATENT DOCUMENTS

2011/0093361 A1 4/2011 Morales
2012/0089623 A1 4/2012 Sobotka et al.

OTHER PUBLICATIONS

International Searching Authority; International Search Report and Written Opinion (Written Opinion not available); International Application No. PCT/IB13/03030; dated Sep. 4, 2014; 3 pgs.

* cited by examiner

COMPUTER-IMPLEMENTED METHOD FOR RECOMMENDATION SYSTEM INPUT MANAGEMENT

CROSS REFERENCE TO RELATED APPLICATIONS

This application claims the benefit of U.S. Provisional Application No. 61/710,564, filed Oct. 5, 2012 and is related to U.S. Nonprovisional application Ser. No. 13/646,190 filed Oct. 5, 2012.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

FIELD

The present invention relates to input management systems. More particularly, the present invention relates to input management systems for recommendation systems.

BACKGROUND

A plethora of varied recommendation systems exist on the Internet. Recommendation systems typically apply knowledge discovery techniques to the problem of making product recommendations during a customer interaction. These systems have found great utility in E-commerce, but the current systems are challenged by the exponential growth in the number of customers, and products available to those customers.

Current recommender systems are challenged by their inherent approach to gathering and managing input to generate recommendations. First, they rely on historical user data to develop an initial knowledge base for the recommendation engine. This reliance causes a "cold start" problem, wherein a recommender system is generally inoperable and unreliable until a certain critical mass of user data input has been accumulated by the system. Second, when dealing with sparse input data, these systems are less able to provide relevant recommendations to customers. For example, input data is considered sparse when product lines or brands are emerging rather than mature.

Collaborative filtering is a type of recommender system technology that works by matching input of a customer's preferences to the aggregate inputted or observed preferences of other customers. Collaborative filtering performance degrades as the number of customers or products increases. A recommendation system capable of quickly producing relevant recommendations without relying on management of inputs associated with preference matching would be desirable. It is further desirable to provide such as system capable of handling very large scale application would likewise be desirable.

Recommendation systems have generally evolved in the extremely interactive environment of the World Wide Web, the system of interlinked hypertext documents accessed via the Internet. These systems apply data analysis techniques to help customers find which products they would like to purchase at E-Commerce sites. For instance, a recommender system of AMAZON.COM (www.amazon.com) suggests additional books for purchase by a customer based on books the customer have already purchased from AMAZON, or, based on books a customer has told AMAZON they like. Another recommender system on CDNOW (http://www.cdnow.com) helps customers choose CDs to purchase as gifts, based on other CDs the recipient has liked in the past.

In general, many recommender systems are an application of a particular type of Knowledge Discovery in Databases (KDD) (Fayyad et al. 1996) technique. KDD systems use subtle data analysis techniques to achieve two primary unsubtle goals. First, these systems attempt to save money by discovering the potential for efficiencies. Second, these systems attempt to generate more revenue by discovering ways to sell more products to customers. For instance, companies use KDD to discover which products sell well at which times of year, so they can manage their retail store inventory more efficiently, potentially saving millions of dollars a year (Brachman et al. 1996). Other companies use KDD to discover which customers will be most interested in a special offer, reducing the costs of direct mail or outbound telephone campaigns by hundreds of thousands of dollars a year (Bhattacharyya 1998, Ling et al. 1998). Companies use KDD to discover a new sales model, and then, apply that model to a new sales application. Businesses use KDD to increase sales of existing products by matching customers to the products they will be most likely to purchase.

KDD-based recommender systems are limited in their ability to perform interactively due to their necessary reliance on association of historical data input. For example, while a customer is at specific web site, typically an e-commerce site, the recommender system must learn from the customer's behavior, develop a model of that behavior, and apply that model to recommend products to the customer. The recommendations are based upon the management of historical data input gleaned from other users.

Both collaborative and content-based filtering recommendation systems require management of a base input user profile, driven by textual input by the user, or, selection of various options. This initial input is also known as seed data. The user profile is used to predict relevant items for each user. Initial user inputs can be refined through subsequent user feedback including ranking or rating items, user purchase behavior, and user social network activity. The recommendation system then compares all the collected data and calculates a list of relevant items for the user.

Additionally, current recommender systems typically require iterative interaction by a user, supplemented by historical information concerning the behavior of other users. For instance, in collaborative filtering approaches, like EBAY or AMAZON, a user's past or historical behavior is analyzed for similarities to the behavior of other users. These types of systems are not flexible and do not allow users to actively participate in the development of their personal preference profile. Users cannot remove actions from their history nor can they create an entirely new profile based on desired actions. A user cannot hypothetically add purchases or browsing history to his account that did not actually occur. Additionally, these systems gradually account for activity over some period of time; inputs cannot be changed instantaneously to adjust the personal preference profile.

In content-based filtering approaches, like PANDORA and NETFLIX, the systems require the user to rate items to provide initial seed data. Inherently, these systems do not yield consistent results when their databases have only a few values, creating an inability to derive the most relevant searchable key attributes. Furthermore, where a recommender system requires a minimum amount of seed data to initiate, a user must spend more time at the outset to implement the system to provide relevant results for the user. In addition, content-based filtering approaches are limited to one-to-one comparisons of content types. PANDORA, for example, can only recommend music; similarly, NETFLIX can only recommend films.

It would be preferable to allow each user to understand how the user's inputs are managed to create relevant recommendations. Current recommendation systems do not lend themselves to user transparency in dealing with input management. A user generally does not understand how a particular recommender system manages the user's inputs to generate subsequent product recommendations. Accordingly, a user would not have a sense as to how to influence those recommendations. Input management for current recommender systems does not leverage visual cues or visual elements to assist a user in developing an understanding of how recommendations are developed by the system.

Consequently, in light of the aforementioned limitations, a need exists for methods and systems to manage input for recommendation systems, using visual cues and elements, wherein user input can be changed instantly and resulting recommendations are likewise changed instantly. In addition, a need exists for methods and systems having transparency in operation so a user can play an active role in determining whether the resultant recommendations are consistent with the user's own perception of his or her personal preferences.

SUMMARY

In view of the foregoing described needs, an aspect of the inventive subject matter is directed to a computer-implemented method and system to manage and support instantaneous and transparent modification of inputs to a recommender system by a user wherein historical data is not a prerequisite to generation of relevant recommendations for items. A further aspect of the inventive subject matter comprises an input management system for recommendation systems that satisfies the above needs for a straightforward, less data-intensive approach for matching each user with relevant items of interest without the need for an initial usage baseline, or specific rating of items of interest prior to provision of relevant results.

The method and system of the inventive subject matter herein, also referred to herein as the "StyleSeek®" method and system, uniquely and directly maps individual users to discrete items without the need for historic user data. The method and system comprises a software module programmed for operation on a computer to support interaction with a user via a plurality of user interfaces. The user interface may be deployed on any one of a web browser across the Internet, a smart phone display, a kiosk in a retail environment, a touchscreen, a holographic display, a gesture recognition interface and other such perceptual user interfaces which may evolve in the future. This flexibility in deployment device and location supports use in both static and mobile environments to suit the requirements of each user and the specific deployment scenarios. The StyleSeek software module provides a means for selecting one or more images or other visual cues or elements to determine a user's preferences. The resulting image selections serve as the initial input to one or more computer-implemented algorithms that transform metadata and attributes associated with the image selections into the user's unique personal preference profile. The personal preference profile is then used by the system software to evaluate, correlate and display relevant recommendations for the user. Hence, the method and system provide input management via visual elements. Although input to the user interface can occur via keyboard and mouse, the method and system is uniquely suited to touch and other such perceptual input and display modalities, including voice and gesture recognition, since the invention emphasizes the use of visual elements, images and graphic representations rather than textual or numeric input.

In keeping with the use of visual elements to create input, an aspect of the inventive subject matter facilitates the use of cognitive and emotional responses from users via the user's visual perception and cognitive interpretation of multiple images to allow digital transformation of the user's cognitive and emotional responses to create the user's personal preference profile, hereinafter, also referred to as the user's "StyleDNA®." Of course, depending on the selected underpinning for the recommendation system, the user's personal preference profile could be referred to as the user's "Social DNA," "Health DNA," "PoliticalDNA," "Emotional DNA," "SexualDNA," "CulinaryDNA," or other such foundational underpinnings. The method and system subtly accesses the user's visceral response to one or more images to generate a collection of images that is subsequently digitally transformed to aptly represent the user's tastes and preferences. The method and system is designed to elicit a visceral response, generated in a fluid manner, where the user is able to provide input merely by selecting various images through the display used for interaction with the system.

The inventive subject matter comprises a computer-implemented method and system for creating, managing, modifying, importing, and sharing inputs to a user personal preference profile, which may then be uses as one or more inputs to a relevance assessment engine to determine a user's personal product, service and lifestyle preferences. In one embodiment targeted toward fashion and lifestyle, the system comprises software for assessing and aggregating lifestyle items via style dimension mapping via one or more computer-implemented algorithms to process metadata associated with one or more selected images. The method and system is easily expanded to support recommendations for personal preferences for other subject matter areas beyond lifestyle preferences. For example, images may be related to a user's religious, political, social, emotional, athletic, sexual, culinary, experiential and other such personal underpinnings or personal attributes that cause each user to have a unique personal preference profile. In other embodiments, images, and therefore resulting recommendations, may be tied to one or a combination of any of the subject matter areas described above. For simplicity in describing the inventive subject matter, the method and system are described in relation to an embodiment wherein "lifestyle" preferences are assessed and recommendations are based upon those lifestyle preferences.

Image metadata need not be disclosed to a user since the system uses preexisting metadata associated with each user-selected image to create individualized vector inputs to create an individualized user lifestyle preference index (i.e. the user's StyleDNA®) and subsequent individualized lifestyle preference output parameters. The generated output parameters are then associated or mapped to a plurality of correlated products, services, lifestyles and experiences for presentation to the user. The system interactively gathers and manages input information about a user's unique preferences driven by the user's image selections. The method and system directly matches each user to discrete items without access to historic data.

The method and system flexibly allows users to continuously interact with the system throughout its breadth to manage inputs to the system. Input management leverages various activities by a user, including (1) the user's instantaneous selection of images relevant to the user's tastes and preferences, (2) creation of one or more separate and distinct user personal preference profiles, StyleDNA, based on user selections, (3) on-demand modification of existing StyleDNA through the selection of a single image, (4) instantaneous import of preferences from another user's personal preference profile (StyleDNA) to create a new or additional StyleDNA for the user, and (5) sharing of the user's StyleDNA and associated personal preferences with other users. The computer-implemented methods and system of the inventive subject matter likewise provides a process to use the aforementioned inputs to immediately generate an updated personal preference profile, which is then used to subsequently generate output to identify relevant items of interest to the user.

In an embodiment of the method and system of the inventive subject matter, multiple images are presented to a user for consideration. Each image serves as an opportunity for visual visceral perception by a user, wherein the image is correlated with associated metadata indicative of a basis for selection of the image by a user. Each image presented to a user for potential selection is pre-associated with structured metadata, which is then applied and processed using various algorithms incorporated within the system software to transform the selected images into the user's StyleDNA. Historical data collection is not a requirement of the method and system. Images used within the method and system have no subject constraints. Images can feature any type of content, including but not limited to, various products, brands, logos, trademarks, landscapes, and even specific people.

Although each image is associated with specific metadata, the use of images to develop a user's StyleDNA provides a more vigorous approach and a greater level of definition for the spectrum of a user's preferences since the user has an innate and instinctive response to each image, in other words, a visceral and subliminal response. Hence, the method and system allows a user to select one or more images based upon the user's conscious and subliminal preference. The selected images then drive the creation of the user's individualized StyleDNA through a unique combination of inputs from the user.

Visual perception, and the subliminal aspects of such visual perception, is an element of the subject matter of the invention. Hermann von Helmholtz is often credited with the first study of visual perception in modern times. Helmholtz examined the human eye and concluded that it was, optically, rather poor. The poor-quality information gathered via the eye seemed to Helmholtz to make vision impossible. He therefore concluded that vision could only be the result of some form of unconscious inferences: a matter of making assumptions and conclusions from incomplete data, based on previous experiences. Hence, the method and system according to various embodiments of the invention uniquely leverages each individual's user-centric experience to refine choices that drive preference definitions. The consideration of an image allows a user to make selections based on unconscious inferences that rely on assumptions and conclusions from incomplete data based on a user's previous experiences. Although every image presented to a user of the system may be interpreted as being visually incomplete, the user's experiential assumptions and conclusions associated with each image create a more complex yet complete view of the user's particular personal preferences. This selection methodology avoids limits found where choices are made using direct selection of structured data attributes. For example, where a user is asked to describe a preference in textual form, or select a preference from a list of descriptors, the user will not necessarily be leveraging unconscious inferences associated with the sense of sight. Hence, where a user may select two images for similar reasons due to his unconscious preferences, the metadata with each image may be distinct, causing the development of a more accurate and reliable assessment of user preferences.

The input management features of the method and system allows users to modify their individual or multiple StyleDNA at any time, using any image within the system. An entire StyleDNA can be replaced with new images; no historical data is required. Determination of a user's StyleDNA is flexible; a StyleDNA can be driven by as little as one image, two or more, or, a plurality of images. In one aspect, the user's StyleDNA is driven by a group of images selected by a user. The number of images selected for the user's StyleDNA group can be adapted based on results of user interaction.

The method and system supports creation of additional StyleDNA by the user, which may be used interchangeably, for example, depending on the mood of the user. Additionally, a user may share their StyleDNA with another individual so that individual can shop for the user or select gifts more likely to satisfy the user's personal preferences. Further, the system allows each user to share his or her StyleDNA with other users, or, import StyleDNA shared by other users. In addition, the system supports the use of exemplary StyleDNA, which may be associated with persons of note, including celebrities, politicians, scientists and other such notable figures. Hence, the method and system provides each user with various alternatives to manage inputs to the recommender system.

BRIEF DESCRIPTION OF THE SEVERAL VIEWS OF THE DRAWINGS

For a better understanding of the inventive subject matter, reference is made to the detailed description contained herein and the accompanying drawings numbered below which are given by way of illustration only and are not intended to be limitative to any extent. Commonly used reference numbers identify the same or equivalent parts of the claimed invention throughout the several figures. These and other features, aspects and advantages of various embodiments of the inventive subject matter will become better understood with regard to the following description, appended claims, and accompanying drawings where:

ASPECTS OF THE INVENTIVE SUBJECT MATTER

Figure 1:
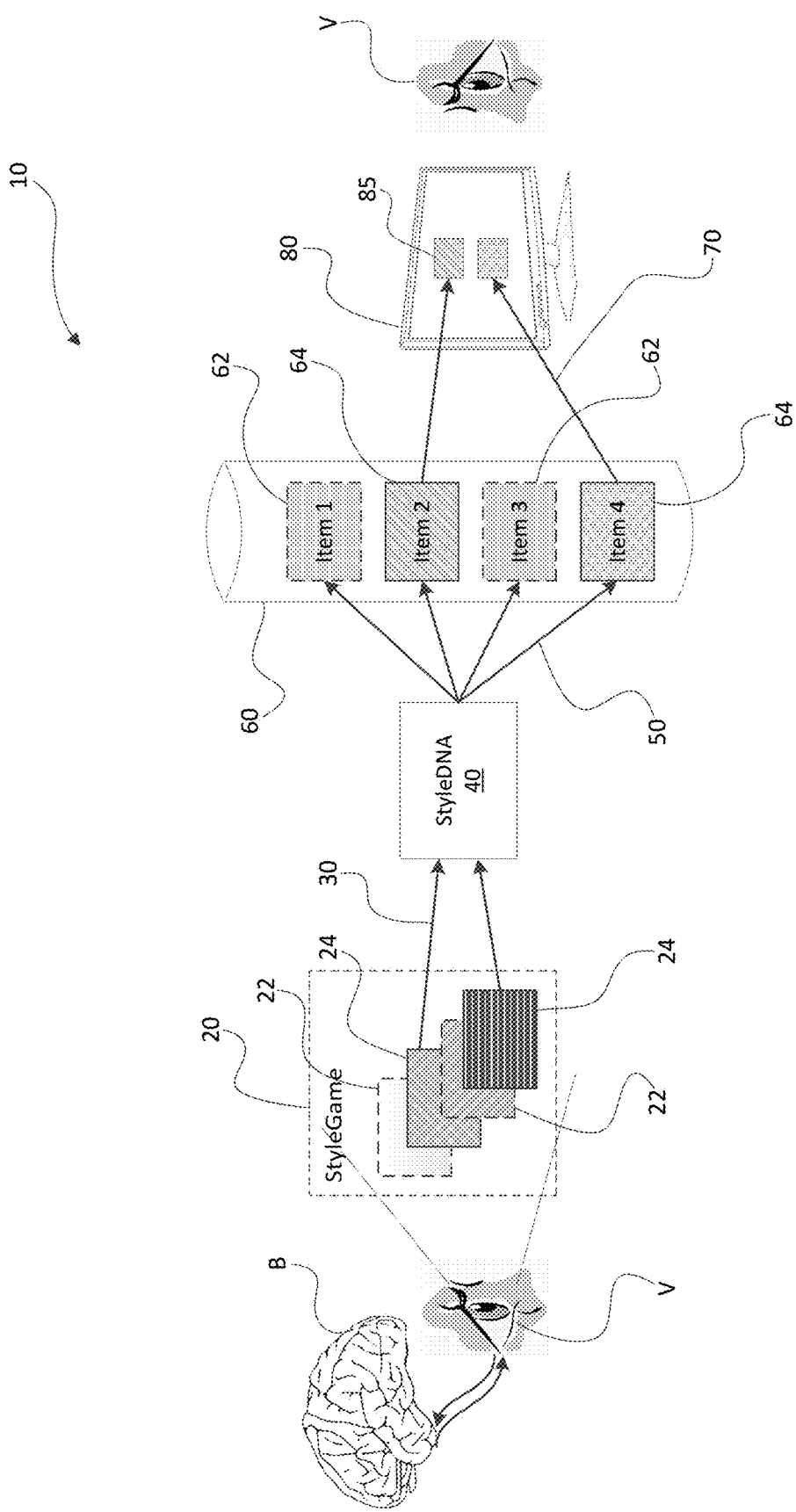
FIG. 1 is a diagram of an overview of the method and system embodying principles of the invention.

One aspect of the inventive subject matter discloses a user-centric method and system for recommendation system input management wherein inputs to the recommender system need not rely on historical data from other users.

Another aspect of the inventive subject matter discloses a means by which a user can provide input to the recommendation system using an inferred or subconscious visceral response to selected images, thereby avoiding reliance on selection of specific narrative text by the user to indicate preferences.

Another aspect of the inventive subject matter discloses a user-centric method and system to transform images selected by the user into an individualized set of recommendations for lifestyle items incorporating intangible style elements, branding, and public perception to provide relevant and accurate results matched to the user's unique personal preferences.

Another aspect discloses a personalized recommendation method and system operable with limited data wherein historic user data is not required to generate accurate results to overcome the cold-start problem inherent to other recommender systems. The first user of the system will receive recommendations equal in quality to any subsequent user of the system.

Another aspect discloses a personalized recommendation method and system operable wherein data from the user is sparse.

Another aspect discloses a personalized recommendation method and system for managing inputs associated with user preferences and associated lifestyle items wherein the user is not required to rate, evaluate, or give scaled or objective preferences for any lifestyle item.

Another aspect discloses a method and system for managing inputs to a recommendation system wherein the user is directly matched to discrete items and products, including, but not limited to, clothing, lifestyle items, and brands, as opposed to being assigned to predetermined categories and then shown specific groups of products.

Another aspect discloses a method and system wherein a user may immediately change his or her inputs to the system by selecting new images for inclusion or replacement of other images in the selection matrix and then receive an immediate update of recommendations from the system based upon the changed inputs.

Another aspect discloses a method and system wherein both user inputs and outputs are delivered in a visual manner rather than through the input and output of text or other data, including selections from drop-down menus.

Another aspect discloses a method and system wherein a user may have one or more personal preference profiles and change between such profiles instantaneously, thereby receiving updated recommendations instantaneously.

Another aspect discloses a user input management method and system wherein the user may elect to use either an entire set of inputs or individual inputs from other users or templates within the user's own inputs.

DETAILED DESCRIPTION

The following description is merely exemplary in nature and is in no way intended to limit the invention, the inventive subject matter, its application, or its uses. Before the inventive subject matter is described in further detail, it is to be understood that the invention is not limited to the particular aspects described, as such may, of course, vary. It is also to be understood that the terminology used herein is for describing particular aspects only, and is not intended to be limiting, since the scope of the present invention will be limited only by the appended claims. In particular, the recommender method and system may be described in the context of "lifestyle" item recommendations, but the method and system is equally applicable to providing recommendations for items of any type, in any category, subject matter, domain or classification.

Unless defined otherwise, all technical and scientific terms used herein have the same meaning as commonly understood by one of ordinary skill in the art to which this inventive subject matter belongs. Although any methods and materials similar or equivalent to those described herein can also be used in the practice or testing of the inventive subject matter, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

Following is a description of computer-implemented method(s) and system(s) for managing inputs in a recommendation system.

First, referring to FIG. 1, features of the method(s) and system(s) are illustrated and disclosed. For simplicity and brevity, the method and system may hereinafter be likewise referred to as the system or the method. In one embodiment, initially, a new user accesses the computer-implemented method and system to initiate a "game" module, hereinafter referred to as the StyleGame® module 20. The StyleGame module 20 causes one or more images 22, 24 to be displayed to the user for visual perception V and mental processing B. The user relies on his or her personal preferences to select one or more images 24 as representative of the user's personal preferences or tastes. The user leaves unselected those images 22 that do not match the user's personal preferences. The selected images 24 are then put through a transformation 30 according to the method and system using a computer and software programmed to operate on the computer to implement the method to generate a unique user preference profile 40 for the user, herinafter the user's StyleDNA 40. After the user's StyleDNA 40 has been generated, the StyleDNA 40 drives correlation 50 against an item database 60. During correlation 50, uncorrelated items 62 are ignored and correlated items 64 are selected. The selected correlated items 64 are then transformed for presentation 70 to the user. The presentation transformation 70 sends images 85 of the selected correlated items 64 to a display 80 presentation to the user for additional visual perception V and mental processing B.

Figure 2:
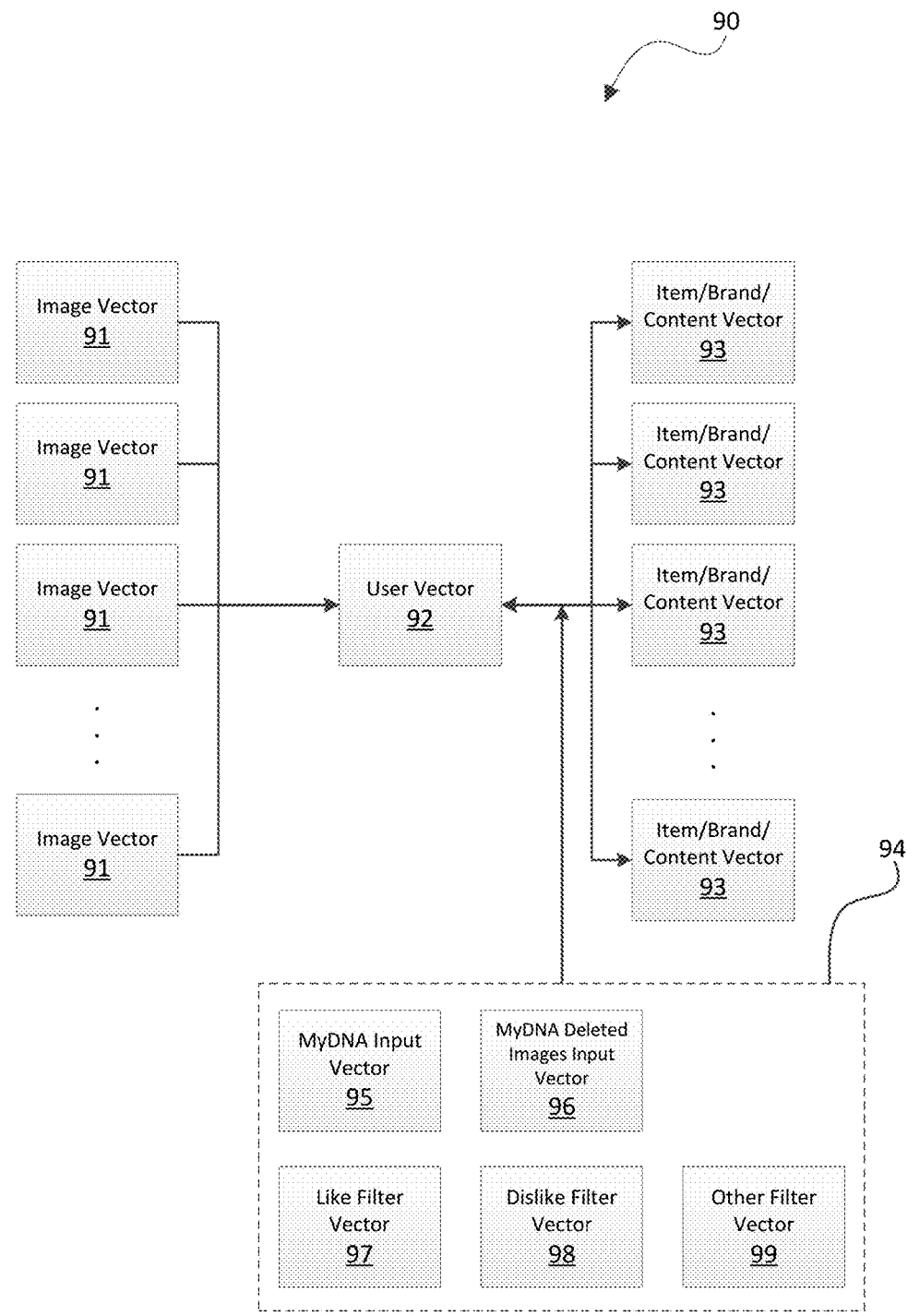
FIG. 2 is a block diagram of the various vectors used in the method and system embodying principles of the invention.

Vector Structure—Now referring to FIG. 2, the vector structure 90 of the system in one embodiment is described in greater detail. First, the system creates user vector 92 based on earlier image selections. The preliminary input vector 92 drives the selection of item/brand/content matches from multiple databases wherein the matches are deemed to correlate with the user's StyleDNA 40. The method and system is not limited in the number of databases 60 and in various aspects, the prescribed number of database matches can be limited to just one database 60 or any number of additional databases 60 with additional category specifications. Individual image vectors 91 driven by the selections by a user from each of the image matrices 1225 are combined by the system to create the individualized user vector 92. The user vector 92 and corresponding product images 1225 comprise a user's StyleDNA 40.

A variety of supplemental inputs can impact input image vectors 91 in providing matched results. These supplemental inputs may be combined to form separate vectors, or merely act as filters against database queries. For instance, account information provided by the user from other Internet sites such as FACEBOOK, LINKED-IN, or PINTEREST may be used within a system of algorithms to enhance the quality of recommendations. Data that may be used includes demographic information, FACEBOOK likes, keywords within comments, occupations, and followers/friends/connections. Additionally, users may select specific items within the StyleSeek database 60 to refine their recommendations. For instance, a user may provide a positive preference for blue dress shirts, and the system will provide a bias towards other similar items. Alternatively, a user may provide a negative preference for sunglasses, for example, and therefore never be shown those item types again, regardless of their match due to the input image vectors 91. The rules for these supplemental systems may be turned on or off by the user to control the results. In other examples, a user may provide a positive preference for a particular piece of furniture, and the system will provide a bias toward other items having similar or complementary associations. For example, a user may select an image of a leather desk chair and the system will provide a bias toward items having similar metadata, such as button-down shirts for men or mahogany desks or brass writing utensils. In other words, the system facilitates selection of items of interest without requiring the user to view and rank similar items of interest. For example, the system does not require a user to assess, evaluate and rank different styles of shirts to determine that the user might be biased toward button down shirts. Likewise, a user may be shown an image of a vehicle, storefront, house or other item and the system will determine the user's preferences for food, sports teams, and other items and products.

Figure 3:
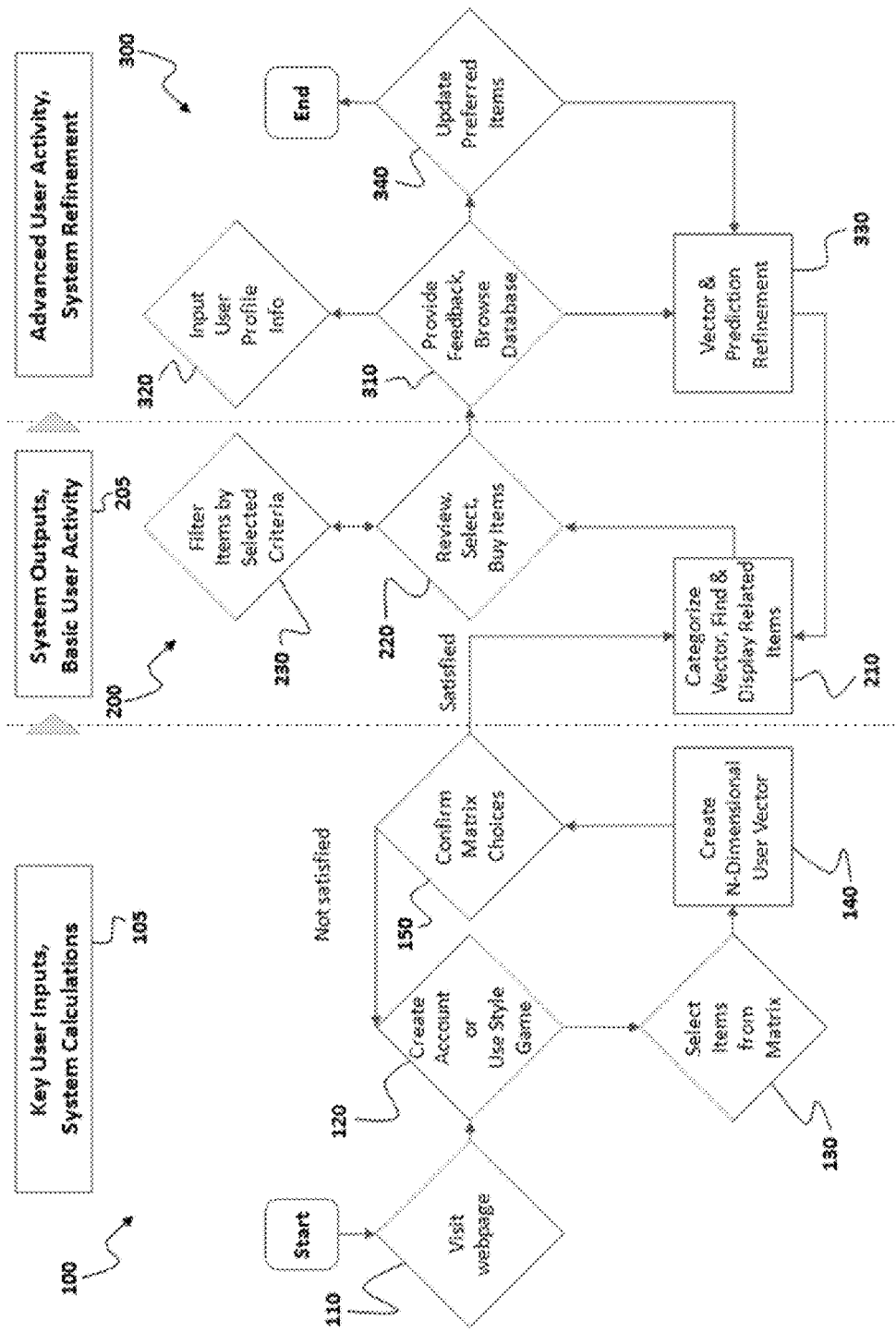
FIG. 3 is a high-level flowchart for management of inputs to the computer-implemented method and system embodying principles of the invention.

Now, referring to FIG. 3, a structured flowchart of the method and system is disclosed. At input level 100, the user provides key inputs 105 to the system software, which then performs various calculations. At output level 200, the system generates various outputs 205 based on the inputs 105 in the form of images of various items and supports basic interaction by the user. At advanced user interactive level 300, the system provides additional functionality to allow advanced user activity, which includes additional refinement of the system via additional user input.

Now, in greater detail, additional features and function at input level 100 are described. At Start step 110, the user visits a web page associated with the system. At choice step 120, the user is prompted to create an account or use the StyleGame 20. If the user elects to use the StyleGame 20, at selection step 130, the user is prompted to select one or more items 1225 from a group 1220 of images of those items 1225. At user vector creation step 140, the system creates a user vector 92 based upon the item images 1225 selected and then, at confirmation step 150, the system requests confirmation to confirm that the user is satisfied with his choices. If the user is not satisfied with the choices, the user can repeat the StyleGame 20 and make different choices. If satisfied, the method and system proceeds to output level 200.

At output level 200, the system generates various outputs 205 and supports basic user activity. At categorization step 210, the system categorizes the user vector 92 and finds and displays related items to the user based on correlation with the user vector 92. At interactive step 220, the system software provides interactive functionality to allow the user to review, select and buy any of the items presented to the user. In addition, at filter step 230, the user is able to filter displayed items by various criteria.

At level 300, the system provides more advanced input management functionality to the user for system refinement. At feedback step 310, the user provides feedback to the system on displayed items and browses a more extensive database 60 of items. At user profile input step 320, the user inputs additional user profile information. At refinement step 330, the system aggregates the additional user input to refine the user vector 92 according to the tastes and preferences of the user. At update step 340, the system updates and displays items deemed preferable to the user.

Now, in greater detail, we describe the flowchart in FIG. 3 depicting a multilevel overview of one aspect of the method and system of the inventive subject matter. The method and system manages correlation at level 100 between inputs 105 to the system and at level 200 to outputs 205 of the system. Only a de minimis initial input 105 from the user is required to initiate the system. At step 130, a user chooses lifestyle items from an image matrix. Although identified herein as a matrix, other aspects support organization of the images in any geometric grouping. For example, the images might be displayed in circular groupings, hierarchical groupings or other similar geometric layouts. At step 140, the system creates an N-Dimensional User Vector 92 from images selected by the user. In one aspect, testing by the inventors has shown that the efficiency and utility of the input management method and system appears to be maximized when the number of choices of lifestyle items available from the image matrix is equal to nine. Users appeared to be best served by this number; cognitively evaluating nine images provides a balance between useful inputs for the system while minimizing the level of effort required by a user, thus minimizing the number of users abandoning the input process due to length of completion time.

Importantly, a user does not rate or rank items displayed in an image matrix. The system does not require an initial baseline assessment of items by the user for initialization, thus overcoming the well-known "cold start" issue associated with existing recommender systems and methods. Instead, at step 210, the method and system according to an embodiment of the invention uniquely and directly maps the user to each specific item, and not to categories, genres, or tags associated with the item. In one aspect, the method and system does not rely on inputs from historical user data or associated historical product acquisition data. A first user of the StyleSeek method and system will experience results equivalent in accuracy to all subsequent users. No machine learning is required. The item/brand/content vectors 93 do not change over time based upon input 105 to the system or user feedback; the item/brand/content vectors 93 are independent of user interactions.

At input level 100, the method and system is configured to first receive initial user inputs 105 and perform various calculations based upon those inputs 105. Next, at output level 200, the method and system uses the results from input level 100 to generate output 205, such as recommended items, which are then displayed to the user for other basic user activity. Finally, at interactive level 300, the method and system provides additional functionality to support more advanced user activity and support system refinement.

At step 110, Visit web page, a user enters the site. The user may enter the site by visiting the web page on their computer, or by using a mobile phone application to view the web page or a phone-specific version of the web page. Alternatively, the user may enter the site to interact with the system and receive recommendations by visiting an in-store interface device. The in-store interface device can be tuned to provide recommendations according to the available store inventory and/or product line. Alternatively, the user may interact with the system while mobile within a mall or other similar environment. The interaction once again may occur via direct interaction with an input device, such as a touch-screen, or, interaction may occur via the passive delivery of a wirelessly transmitted unique identifier that communicates the user's identifier to initiate recommendations based upon the user's StyleDNA 40. Likewise, a user may enter the site by interacting with an email, text or other digital communication wherein the email or text communicates items of potential interest to the user and the user can directly investigate the item or access the site via a link on the email.

At step 120, the user is provided with two choices: 1) Create Account, or, 2) Use StyleGame. If a first time user, the system will require the user to first create an account. The system prompts the user to enter information to establish their contractual relationship and account with the system. If the user has an existing account, the system launches the user to an interactive interface, called the StyleGame 20, where a matrix of images is selected by the user. The StyleGame 20 orchestrates the creation of a user's unique personal preference profile, otherwise known as the user's StyleDNA 40.

Figure 12A:
FIG. 12A is a first view of an exemplary screen of the user interface associated with the StyleGame of FIG. 11 wherein a user has not made any image selections embodying principles of the invention.
Figure 12B:
FIG. 12B is a subsequent view of an exemplary screen of the user interface associated with the StyleGame of FIG. 11 wherein a user has made several image selections embodying principles of the invention.
Figure 12C:
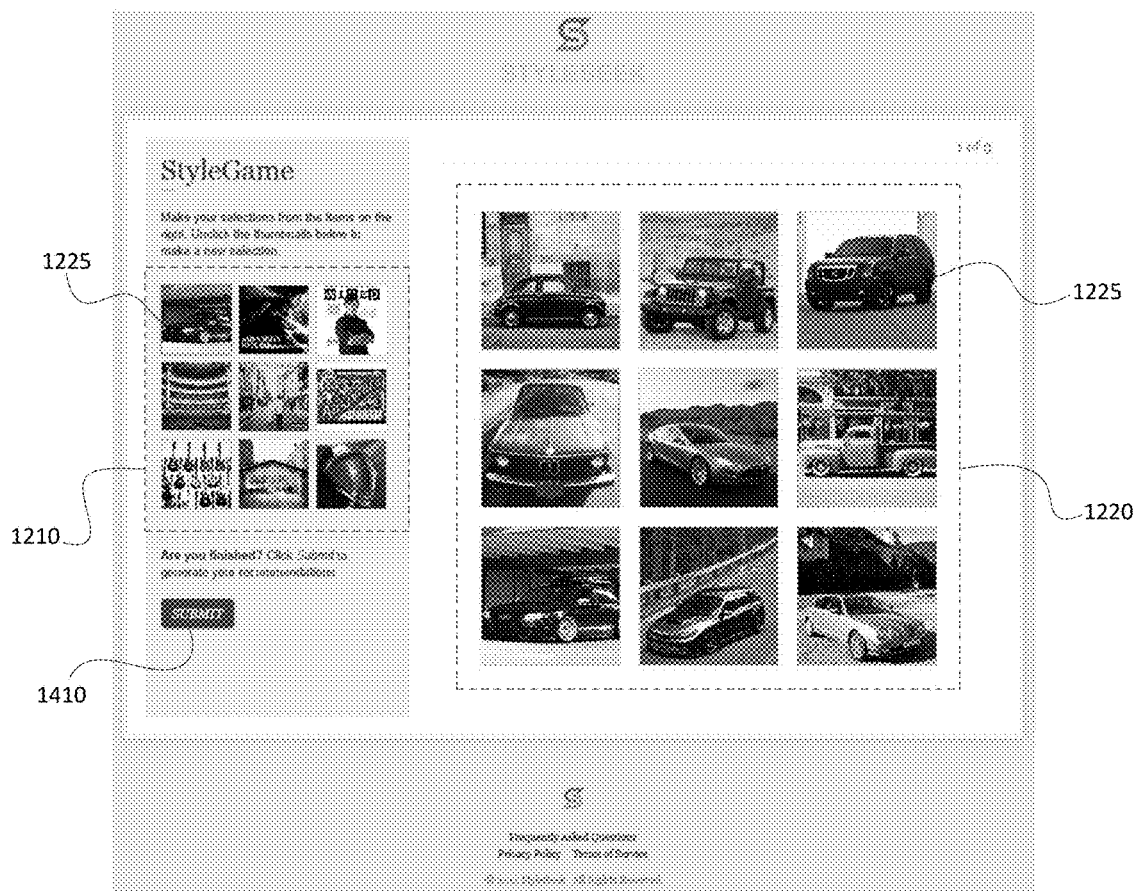
FIG. 12C is a final view of an exemplary screen of the user interface associated with the StyleGame of FIG. 11 wherein a user has completed his selection of images embodying principles of the invention.

At step 130, Select Items from Matrix, the system prompts the user to select a plurality of items from various image sets for inclusion in the StyeGame 20 matrix. The system repeats step 130 until the user has completely filled the StyleGame 20 matrix with images selected from the earlier image sets presented to the user. FIG. 12A, FIG. 12B and FIG. 12C illustrate exemplary screens displayed to a user during the user's interaction with and completion of the StyleGame 20. FIG. 12A is an illustration of the initial empty matrix displayed to a user before any items have been selected from various image matrices; FIG. 12B is an illustration of a partially completed matrix; FIG. 12C is an illustration of a completed matrix.

The user interacts with and selects images of items from one or more matrices of pictures or image sets. At step 140, Create N-Dimensional User Vector, the system causes the computer system to process the various attributes associated with the user's selections according to one or more algorithms. Once the user has selected the number of images required to complete his StyleGame 20 matrix, the system generates an N-dimensional user vector 92. At step 150, Confirm Matrix Choices, the system prompts the user to confirm his matrix choices. The user confirms completion and satisfaction with item choices, with the option to change any previous image selections. Any changes will be reflected in a newly created user vector 92.

At output level 200, System Outputs and Basic User Activity, the system causes various outputs 205 to be generated and supports basic user activity. At step 210, Categorize Vector, Find & Display Related Item, the system categorizes the user vector 92 associated with the user's StyleDNA 40 and then correlates the user vector 92 against a database 60 of items to find and display relevant items for recommendation to the user.

At step 220, Review, Select, and Buy Items, the user may review displayed items, and then select them interactively to learn more about the item or to purchase the item via affiliate networks, or directly through the site. At step 230, Filter Items by Selected Criteria, the user has the option to filter initial displayed results by style dimension, occasion, color, price, brand, or other attributes.

At level 300, Advanced User Activity, System Refinement, the method and system presents the user with additional options to alter various prior inputs 105. At step 310, Provide Feedback, Browse Database, the system prompts the user to provide feedback on an item a number of different ways: rating (like/dislike), commenting, recommending, or other options. Additionally, the user may opt to browse other items in the database (whether related or not), "follow" other users of choice, or simply browse choices made by other users. At step 320, Input User Profile Info, the system presents an input page to the user so that he may enter personal information for potential presentation to other users of the system.

In another aspect, the system provides additional input pages to allow the user to configure and adapt his StyleDNA 40 according to additional information input by the user, such as height, weight, hair color, brand preferences, price preferences, color preferences, material preferences, fit qualifiers and other relevant attributes, specific to the recommended items.

At step 330, Vector & Prediction Refinement, the system adapts and refines both the user's input vector 92 and predictive output. As user activity, selection, and site input increases, the system dynamically adjusts a user's initial input vector 92 and related item predictions to account for and reflect these additional inputs.

At step 340, Update Preferred Items, the system automatically updates correlated items to present new or updated recommendations of preferred items to the user. In addition to these automatic vector and prediction updates based on user activity, a user may also force updates by changing his inputted preferences at any time.

Creation of Input Vectors—Referring to FIG. 2, the input vector structure 90 drives multiple aspects of the method and system, the system leverages three primary vectors: 1) image vector 91, 2) user vector 92, and 3) item/brand/content vector 93. The system creates an individual image input vector 91 (hereinafter, the image vector 91) which is associated with each image of an item/brand/content presented to a user. An aggregate input user vector 92 (hereinafter, the user vector 92), in one aspect, is computed by the system as the weighted average of the image vectors 91.

This transformation of a user's preference of certain items into an aggregate user vector 92 is described by the following equation:

$$v_{input} = \frac{\sum_{i=1}^{m} [i_1, i_2, i_3, i_4, i_5, i_6, i_7, i_8, i_9]}{m}$$

Wherein, $v_{input}$ is the user vector 92 and $i_1$ through $i_9$ exemplify individual image vectors 91, with m the number of individual image vectors 91 created and used in establishing the user vector 92.

In a broader aspect, the method and system correlates and recommends any type of item including, among other things, clothing, accessories, jobs, colleges, hotels, food, furniture, decor, electronic devices, destinations, neighborhoods, cars, etc. Likewise, the items and products can be correlated against a plurality of categories or domains. For simplicity, in one aspect, the system herein focuses on recommendations for men's clothing. However, the methodology and approach is the same for recommendations for any type of item, product, etc.

In an embodiment emphasizing recommendation of lifestyle items, the user visits a website, mobile application or other user interface and is prompted with a set of lifestyle image groupings or matrices. The image matrices can be randomized, but include categories such as Cars, Movies, Music, Magazines, Cities, Objects, Alcohol Brands, Activities/Sports, Restaurants, and Houses. The user clicks one image he likes from each category grouping, and upon completion of all selections to complete the matrix, the user is presented by the system with recommended items/brands/content deemed to correlate to the user's personal preferences and style. In this instance, the user will receive recommendations and be shown specific articles of clothing for purchase, as well as information regarding the clothing brands deemed by the system to be most relevant to his personal preferences and style.

Features of the method and system of the inventive subject matter are several. For example, a first user of the system receives recommendations equal in quality to recommendations to subsequent users. Additionally, the system does not require a user to objectively or quantifiably rate, evaluate, or give preferences for clothing, clothing brands, or anything immediately related to fashion to generate his or her personal preference profile, known as the StyleDNA 40. Further, the system uniquely and directly matches discrete clothing items, brands and other content with the user according to his or her StyleDNA 40. Still further, the system does not associate or assign a user to predetermined categories to justify the presentation of specific groups of products based upon those assigned predetermined categories.

The method and system provides a vehicle that gathers and receives input information about a user's unique lifestyle preferences. This input information is then correlated to clothing, brands, content and other lifestyle items. The computer-implemented method and system comprises elements of style dimension mapping, inputs, outputs, and one or more algorithms.

Now, in greater detail, the structure, function and operation of the method and system of the input management aspect of the inventive subject matter is described.

Figure 4:
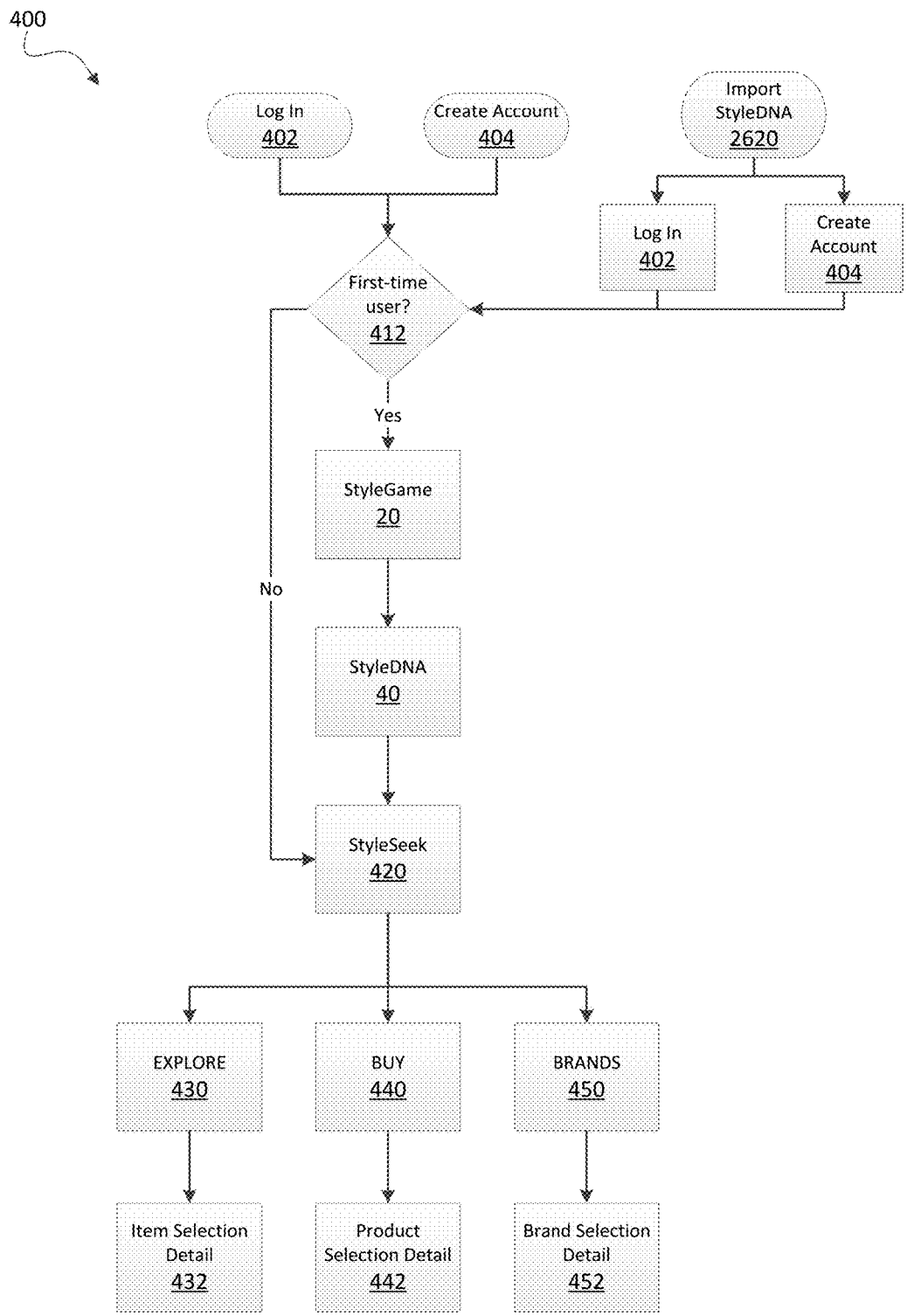
FIG. 4 is a block diagram illustrating the top-level structure of the software interface embodying principles of the invention.

Referring to FIG. 4, in one aspect, upon visiting the StyleSeek website 400 associated with the method and system, the user is presented with an option to either directly Log In 402, wherein the user can access a previously-created account 700 and saved preferences, or, to Create Account 404, wherein the user can generate a new user account to access the system. Alternatively, in another aspect, a user may also engage with the system while reviewing the StyleDNA of another user or while simply reviewing brands, items, and other content at another website. Fundamentally, a prospective user can access the functionality of the system from any other application or even from an individual image of a product of interest to the user. This element of ubiquitous access expands the applicability of the system to any interactive digital source of information.

In the case of viewing another person's StyleDNA, the user is provided with an option on the StyleSeek website 400 to import the other person's StyleDNA. Consequently, the user is able to access the Log In 402 and Create Account 404 options directly from an Import StyleDNA function 2620. However, if a user is not logged into the site under an existing account 700, upon attempting to use the Import StyleDNA function 2620, the system presents the user with the option to either Log In 402 or Create Account 404 options. After the user has logged in or created a new user account, the system then performs a first-time user check 412 to determine whether the user is new or has previously used the StyleSeek website 400. If the user is new, the system prompts the user to create a first StyleDNA 41 via an interactive computer-implemented process hereinafter referred to as a StyleGame module 20. A user's first StyleDNA 41 is created through completion of the Style-Game 20. If the user began the StyleSeek website 400 entry process with the Import StyleDNA function 2620, the particular StyleDNA 40 the user selected for import is added to the user's Imported StyleDNA 2120 along with the de novo creation of the user's initial StyleDNA 41. If the user is not new and has an existing account 700, the user is taken directly to the main web page 420 of the StyleSeek application, bypassing the initial StyleGame 20 process required for new users.

Figure 5:
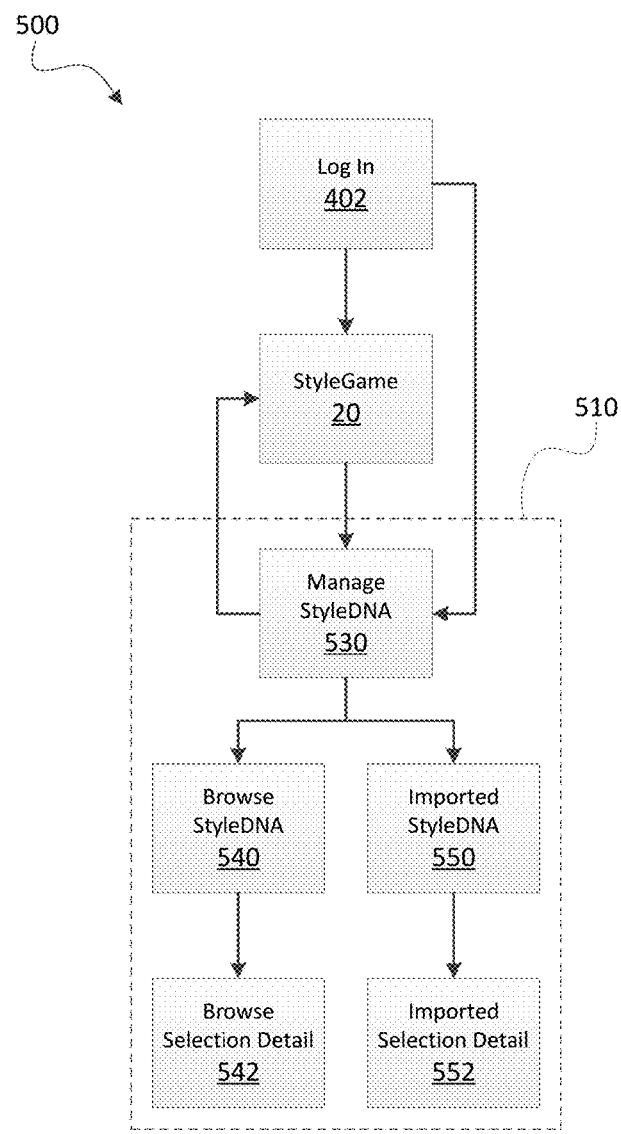
FIG. 5 is a block diagram illustrating the structure and components of the Manage StyleDNA module of the software embodying principles of the invention.

Manage StyleDNA Module—Now, referring to FIG. 5, a Manage StyleDNA module 500 of the method and system is disclosed. In one aspect, a StyleDNA site section 510 can be directly accessed via a Log In screen 402. After logging in, the user may go directly to the Manage StyleDNA page 530, or, if it is the user's first time logging in, they may be taken to StyleGame 20 before accessing the Manage StyleDNA page 530. At the Manage StyleDNA page 530, the user is presented with a list of his various StyleDNA 40, represented by a StyleDNA picture icon 2110, name, and date. The user may hover over any StyleDNA picture icon 2110 included in the list with his mouse pointer or other input method and select a gear icon that appears while hovering over the picture icon 2110. Selecting the gear icon enables a function to allow the user to rename the specific StyleDNA 40.

Figure 6:
FIG. 6 is a block diagram illustrating the structure and components of the Global module of the software embodying principles of the invention.

Global Module—Now referring to FIG. 6, a Global module 600 allows a user to review non-personalized items. A "non-personalized" item is defined herein as an item presented to a user wherein the item has not been earlier selected by the user for incorporation as a vector used to create the user's active StyleDNA 40. Access for review of non-personalized items is available through three primary functions. First, a user may select the "All Brands" function 620. Alternatively, a user may select the "Occasions" function 640. Finally, a user may select a separate Search function 660 at the top of the homepage.

Additionally, to further expand access to specific items that might be relevant to a user's StyleDNA 40, a search box 662 at a top right hand corner of the main web page 420 allows the user to access the Search function 660 and perform a keyword search for specific items like "blue polo shirt," product features like "Goodyear welt," or even styles like "Street Style" or "Alternative." The search box 662 is available globally from any page on the StyleSeek website 400.

Figure 7:
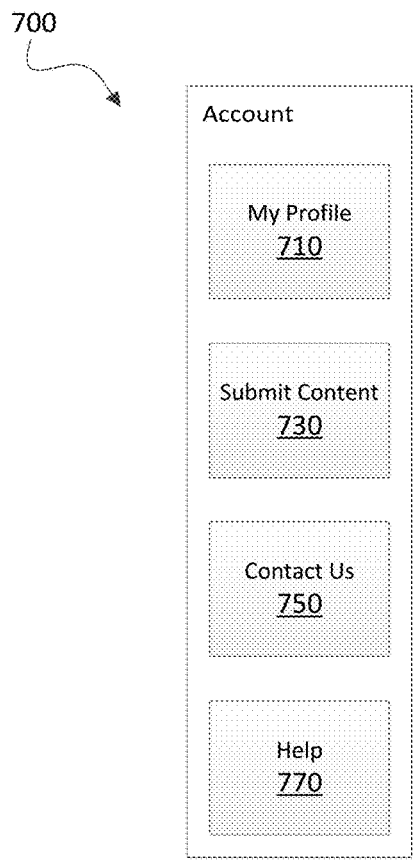
FIG. 7 is a block diagram illustrating the structure and components of the user Account module of the software embodying principles of the invention.

User Account—Now referring to FIG. 7, the system provides a user's account 700 containing data relevant to the user's individually identifiable information, the user's website preferences, and, general information concerning the website 400. In one aspect, the user accesses his account 700 by selecting "Account" 702 in the upper right hand corner of the StyleSeek website 400. The user may view and edit his individually identifiable information and preferences by selecting "My Profile" 710. He may enable a function to submit content to the StyleSeek website 400 by selecting the "Submit Content" module 730. He may contact the website owners or managers by selecting "Contact Us" 750. He may access a help page with information about using the Style-Seek website 400 by selecting "Help" 770.

Concerning content contribution by a user, in addition to using the functionality of the system to develop his or her own StyleDNA 40, the system likewise provides functionality to allow a user to contribute original or sourced content to the StyleSeek website 400. The system can use this contributed content in a number of different ways. To contribute content, the user first selects and clicks on "Account" 702 in the upper right hand corner of the Style-Seek website 400. This launches a separate content submission module 730 to allow the user to "Submit Content." The content submission module 730 allows the user to contribute original or sourced content. In one aspect, before any user-contributed content may be added to the system, the contributed content is reviewed by a site content review team, which may consist of human reviewers, an automated software review system, or a combination thereof, to determine if the offered content is relevant and appropriate to aggregate with the site database for subsequent presentation to other users.

Figure 8:
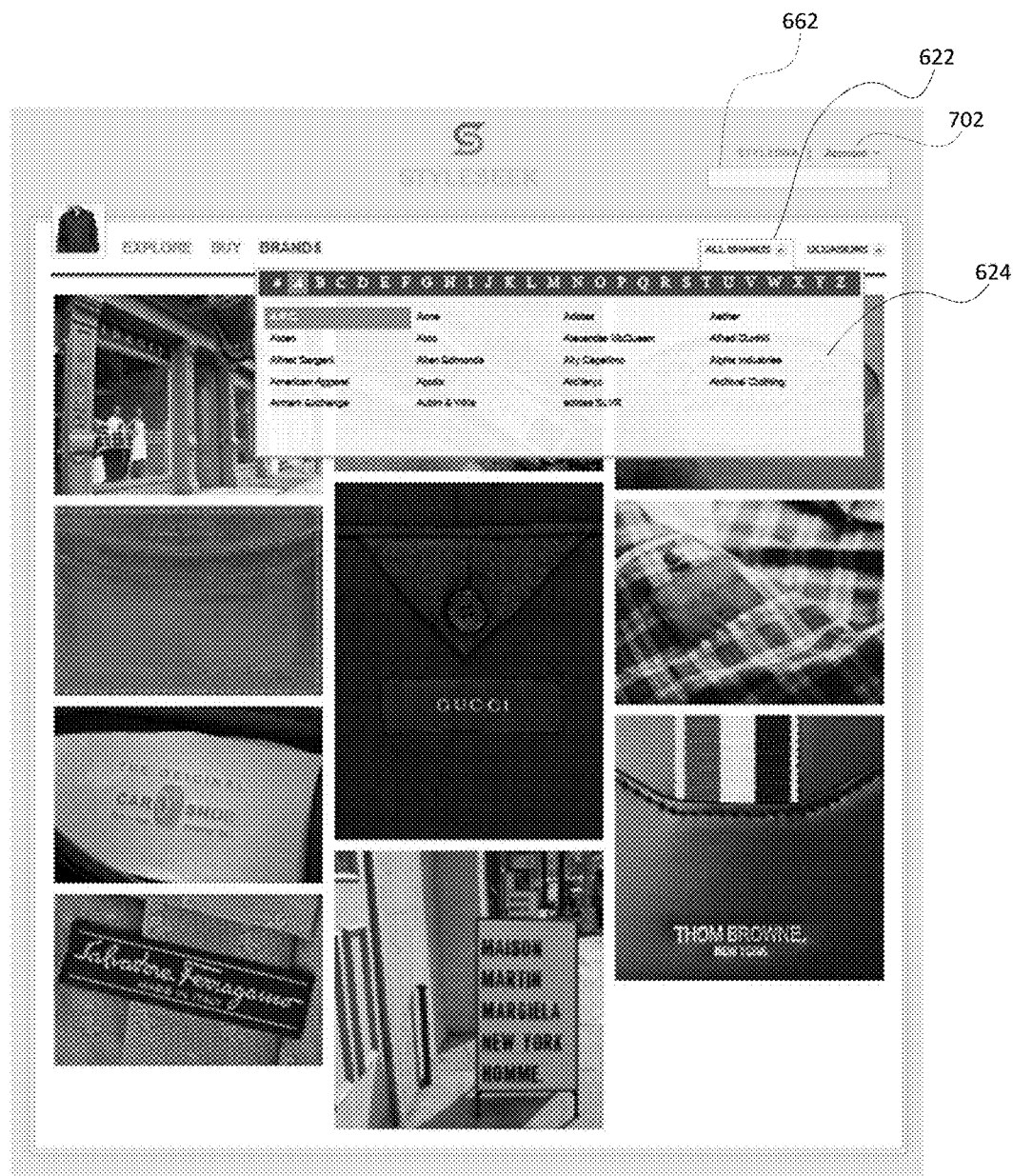
FIG. 8 is an exemplary screen shot of the user interface associated with the "All Brands" selection from the Global module of FIG. 6 embodying principles of the invention.
Figure 32:
FIG. 32 is an exemplary screenshot of the detail page for a particular brand selected from the Brands user interface of FIG. 31 embodying principles of the invention.

Referring to FIG. 8, the method and system likewise supports search by all available brands in the system. For example, a user can search broadly by specific brands by clicking the "All Brands" dropdown selector 622 on the main web page 420, or, by using the search box 662 on the main web page 420 to find a specific brand. Clicking the All Brands dropdown selector 622 presents the user with a brands list 624 of all brands associated with content in the system, arranged alphabetically. Referring to FIG. 32, selecting a particular brand will filter content results to that brand, displaying brand images 5120 representing products aggregated from the selected brand. The All Brands dropdown selector 622 and its associated functionality is available globally from any page of the website 400.

Figure 9:
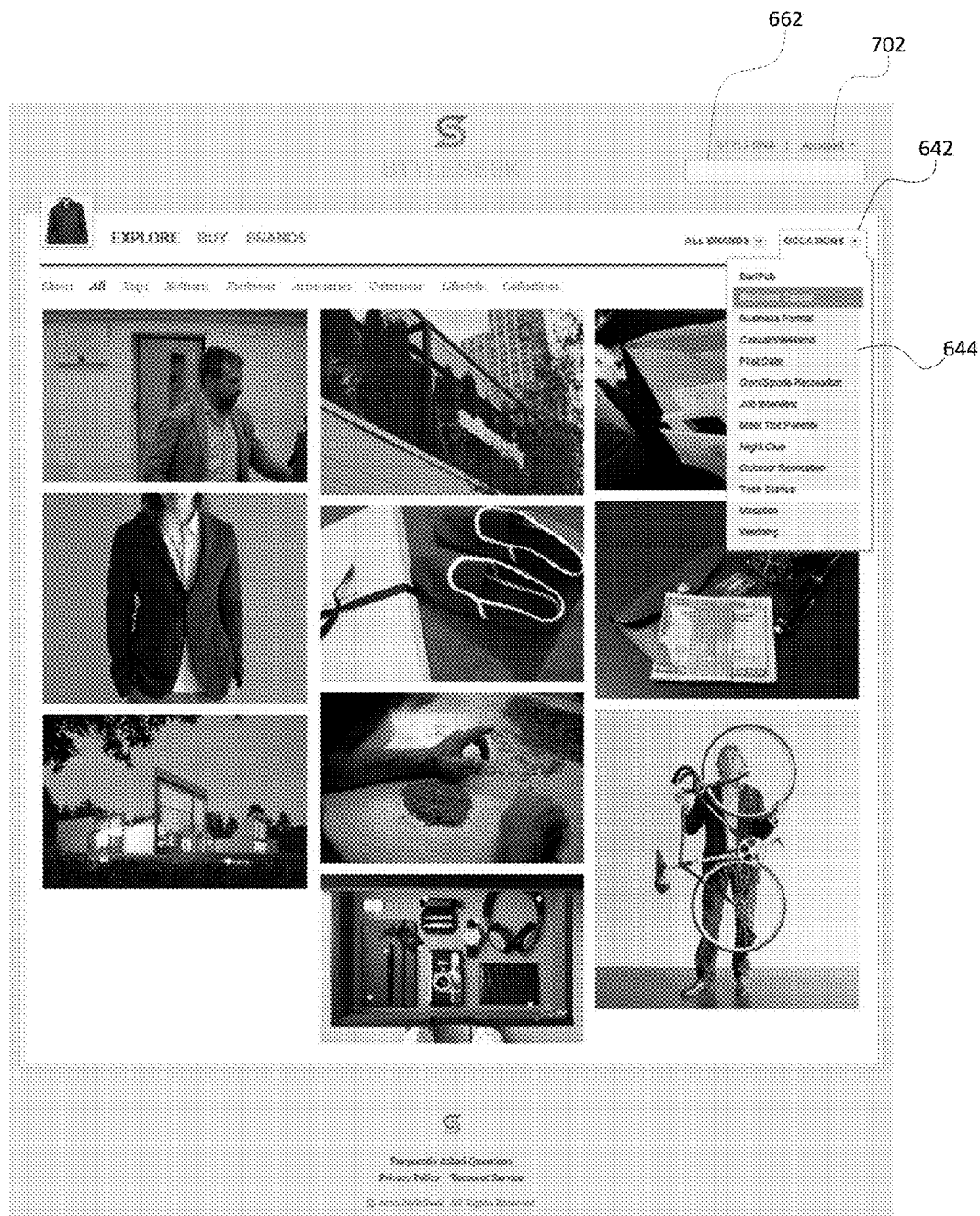
FIG. 9 is an exemplary screen shot of the user interface associated with the "Occasions" selection from the Global module of FIG. 6 embodying principles of the invention.

Referring to FIG. 9, the main web page 420 includes an "Occasions" dropdown selector 642 that allows the user to access the Occasions function 640 and view products and content grouped by occasion categories 644, such as "Job Interview," "Date Night," "Tech Startup," and others.

Figure 10:
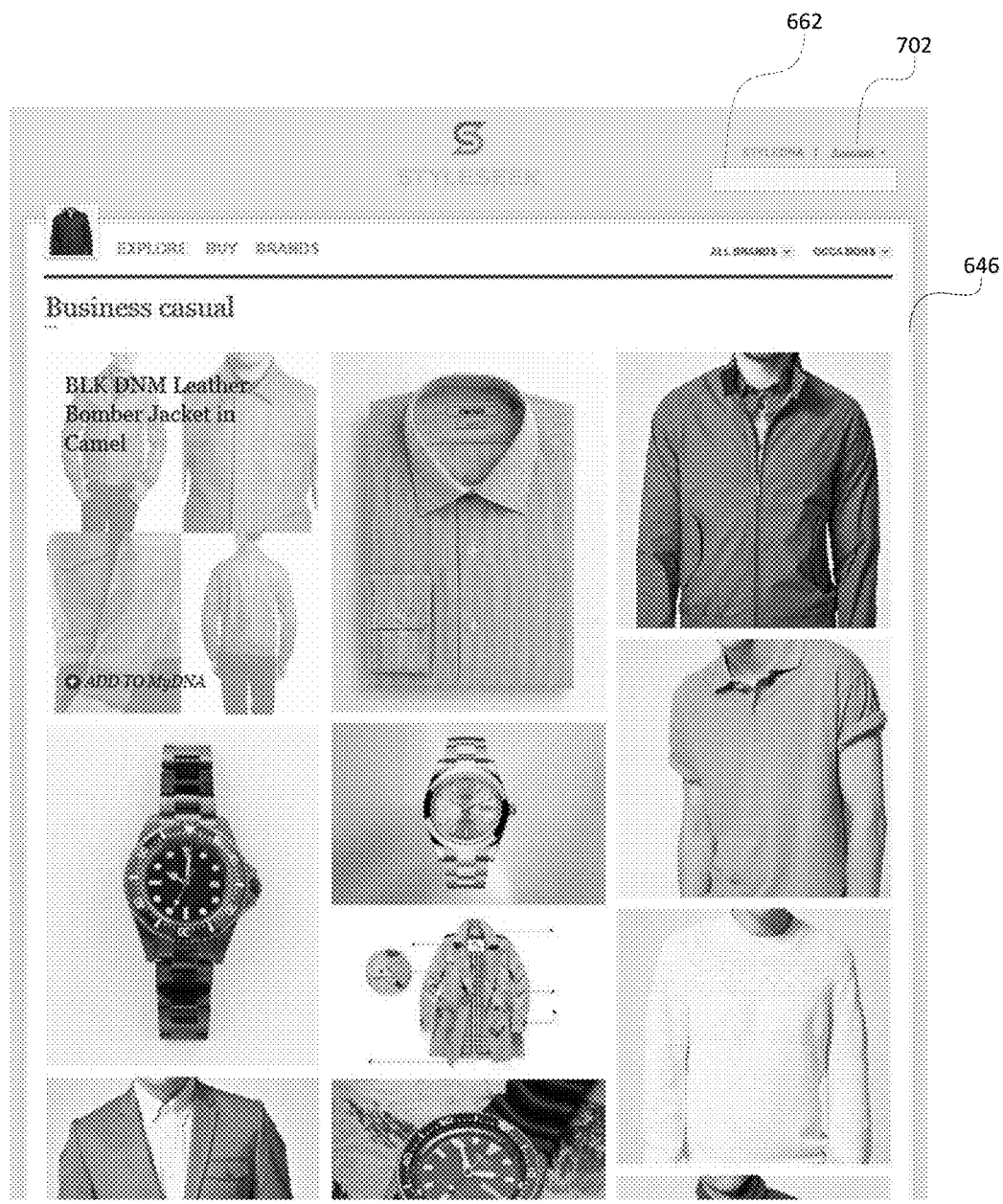
FIG. 10 is an exemplary screen shot of the user interface associated with a selection of "Business casual" from the "Occasions" drop down list of FIG. 9 embodying principles of the invention.

Referring to FIG. 10, results are displayed on an Occasions results page 646. A product may be associated with multiple occasions results. The Occasions dropdown selector 642 is available globally from any page on the website 400.

Figure 11:
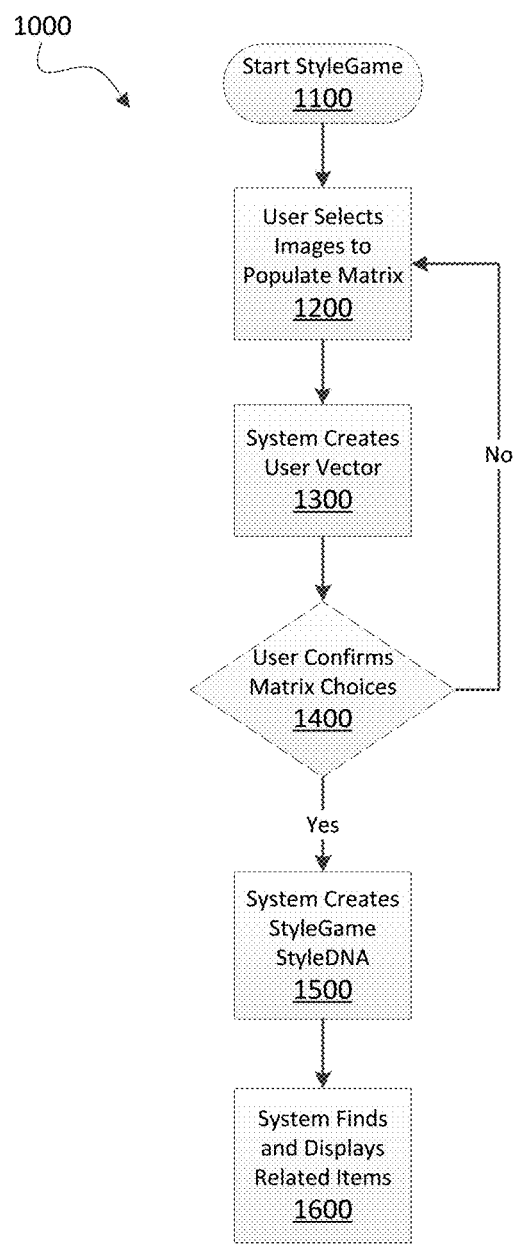
FIG. 11 is a flowchart illustrating the computer-implemented method of the StyleGame embodying principles of the invention.

StyleGame Module 1000—Now referring to FIG. 11, the structure and operation of the StyleGame module 1000 is illustrated and described. As previously indicated, a user creates his or her own unique StyleDNA 40 by "playing" the StyleGame 20. In initiate step 1100, the system prompts a user to start the StyleGame 20. An objective of the StyleGame 20 is to complete an image matrix 1210. At selection step 1200, to create a first StyleDNA 40, a new user is presented with one or more image groups 1220 and prompted by the system to select one or more images 1225 from the image groups 1220 to populate the image matrix 1210. Each image group 1220 displayed to the user is comprised of variable image content. Each image 1225 is indicative or illustrative of various lifestyle preferences. Image groupings 1220 are provided to a user in categorical or randomized presentation. In one aspect, each image group 1220 includes images 1225 having a common category likely to be implicitly or explicitly discernible to a user. Exemplary categories include but are not limited to Cars, Movies, Music, Magazines, Cities, Objects, Alcohol Brands, Activities, Sports, Restaurants, and Houses. Each image 1225 provided in a group 1220 is mapped via associated metadata to an assessment engine comprising one or more proprietary algorithms. Each algorithm is configured to assess an n-dimensional space for various style components.

Referring to FIGS. 12A, 12B and 12C, an illustrative example of the process associated with playing of the StyleGame 20 is described. At selection step 1200, where the user selects items to populate a StyleGame input matrix 1210, the user is presented with a first interface screen (FIG. 12A), where the user is prompted to select at least one image 1225 from a first image grouping 1220 to fill a first empty cell 1215 of the StyleGame input matrix 1210. After this image 1225 is selected and added to the StyleGame input matrix 1210 to fill the empty cell 1215, additional image groupings 1220 are subsequently presented to the user for selection of an image 1225 from each subsequent image grouping 1220.

Referring to FIG. 12B, an exemplary screen shot of the StyleGame input matrix 1210 is shown just prior to completion. Eight of nine cells 1215 have been filled and only one empty cell 1215 remains.

Referring to FIG. 12C, the StyleGame input matrix 1210 has been completed by the user. The system then displays an option button 1402 to the user to allow the user to submit the current completed StyleGame input matrix 1210 to the system for processing. Once the user selects and activates the Submit button 1402, the method and system transforms the image selections in the StyleGame input matrix 1210 and generates a preliminary input vector 92 for the user. The preliminary input vector 92 is a transformational composite of the individual image selections 1225 gathered in the StyleGame input matrix 1210.

Once again referring to FIG. 11, and with additional reference to FIG. 2, upon completion of the StyleGame 20, the system ingests and processes the user vector 92 created at step 1300. The system at step 1400 presents the user with an option to confirm selection of the chosen images 1225 in the StyleGame input matrix 1210. Once the user has confirmed his matrix choices, at step 1500, the system then creates a StyleGame StyleDNA 41 based on the user vector 92. The system then performs one or more calculations driven by one or more algorithms to create an association of the preliminary user vector 92 with one or more databases 60. Each database 60 is comprised of a plurality of different items to which the preliminary user vector 92 will be correlated. At a higher level, once the user confirms choices at step 1400, and the system creates the user's first StyleDNA 41 at step 1500, at step 1600, the system then finds and displays correlated items to the user.

Figure 13:
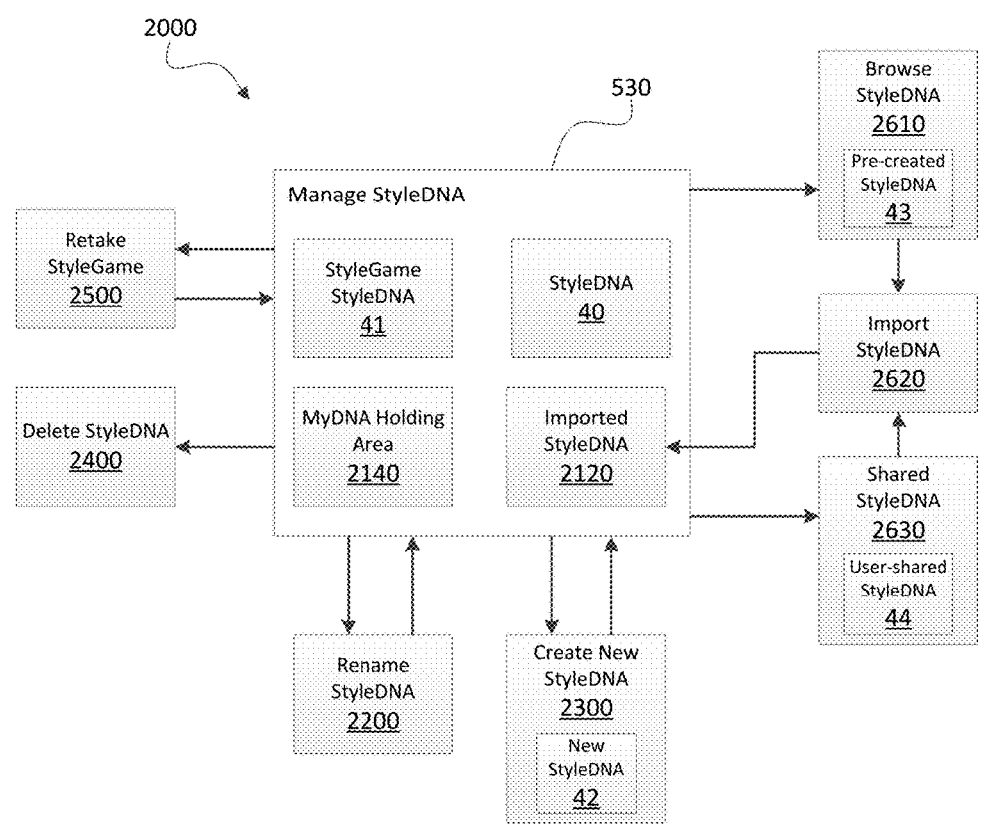
FIG. 13 is a functional block diagram of the structure and operation of the Manage StyleDNA module embodying principles of the invention.
Figure 14:
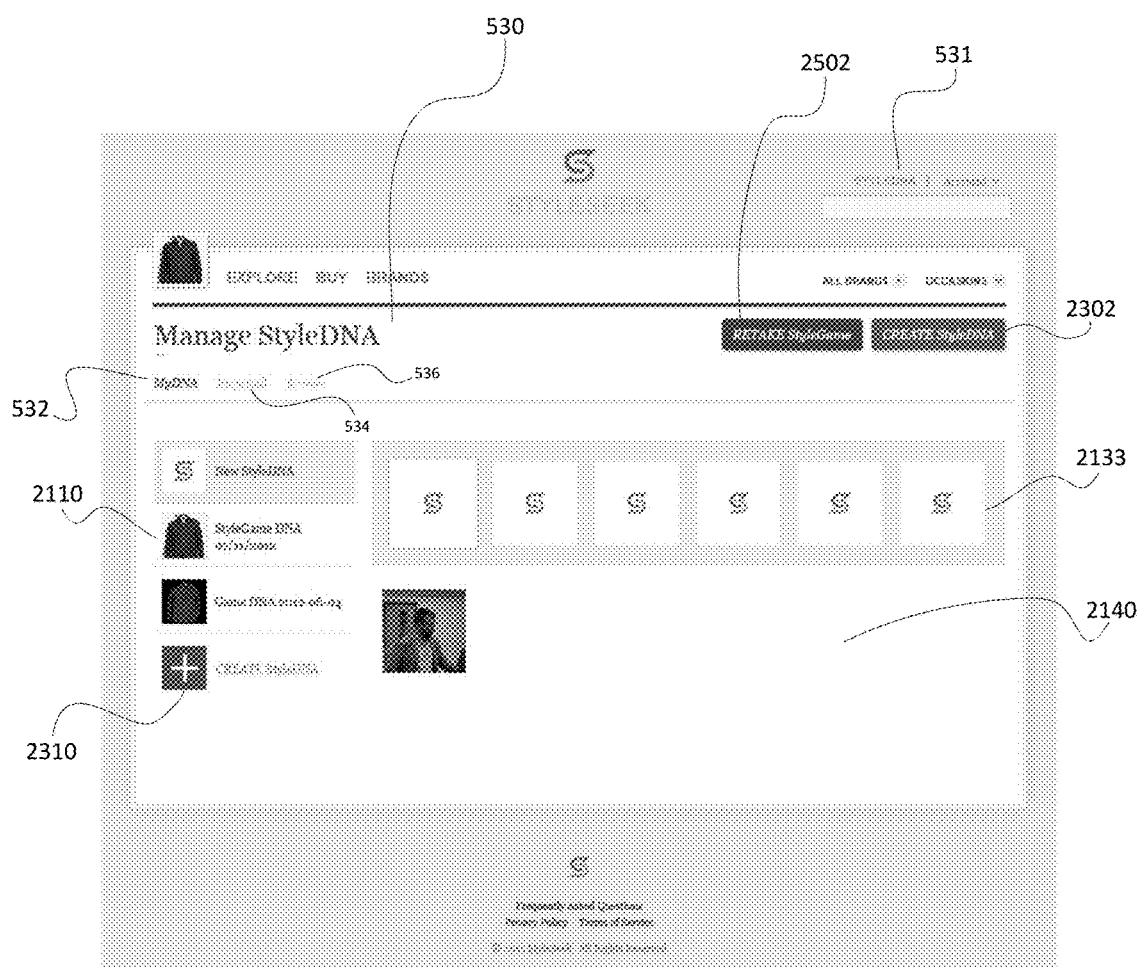
FIG. 14 is an exemplary screen shot of a first user interface associated with the Manage StyleDNA module of FIG. 13 embodying principles of the invention.

Now referring to FIG. 11, FIG. 13, and FIG. 14, when a user completes the StyleGame 20, at step 1500, the system creates and saves a unique StyleDNA 41. This StyleDNA 41 is displayed on the user's Manage StyleDNA page 530 as "StyleGame DNA dd-mm-yyyy", wherein "dd" is the day of the month, "mm" is the month, and "yyyy" is the current year. This first StyleDNA 41 is fully customizable and re-nameable. Images in any StyleDNA 40 may be removed or replaced at any time with other images a user has selected and made available within an area of the website 400 referred to as the MyDNA Holding Area 2140. A user can create additional StyleDNA 40 using the results of the StyleGame 20 or by using new images selected from the MyDNA Holding Area 2140.

Once the system has created a first StyleGame StyleDNA 41 based on the user's completion of the StyleGame 20, the user is presented with access to a main web page 420 of the StyleSeek website 400. In one aspect, the StyleSeek main web page 420 provides access for the user to three primary web page tabs 430, 440, 450. The user may interactively select any of the tabs using a selection device such as a mouse, a touch screen interface or vocal activation. The tabs include "EXPLORE" 430, "BUY" 440, and "BRANDS" 450. A user selects any of these tabs 430, 440, 450 to access content that has been personalized for the user based on the user's currently selected and active StyleDNA 40.

Manage StyleDNA—Referring to FIG. 13, the block diagram illustrating the structure and operation of the Manage StyleDNA module 2000 is described. For purposes herein, StyleDNA are generally referred to with the reference numeral 40. However, various StyleDNA may be described with other reference numerals for clarification, such as, 1) first StyleDNA 41, 2) new StyleDNA 42, 3) newly created StyleDNA 43 and 4) User-shared StyleDNA 44. The Manage StyleDNA module 2000 may be accessed from the Manage StyleDNA page 530. The Manage StyleDNA module 2000 serves as a portal to more advanced functions associated with creation or modification of StyleDNA 40. First, the StyleGame StyleDNA 41, which is first created by the user, is accessible. Additionally, other StyleDNA 40 are accessible. Further, other images 1225 are accessible via an area referred to as the MyDNA Holding Area 2140. The MyDNA Holding Area 2140 displays other images 1225 of interest previously saved by the user, which may be selected for use in one or more of current or new StyleDNA 40.

Figure 15:
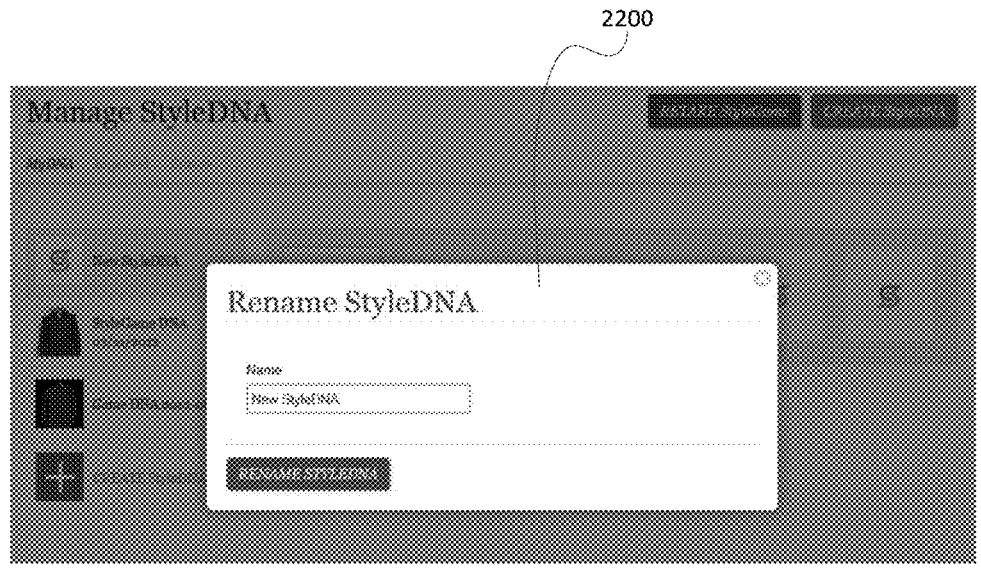
FIG. 15 is an exemplary screen shot of "Rename StyleDNA 40" associated with the Manage StyleDNA user interface of FIG. 14 embodying principles of the invention.
Figure 16:
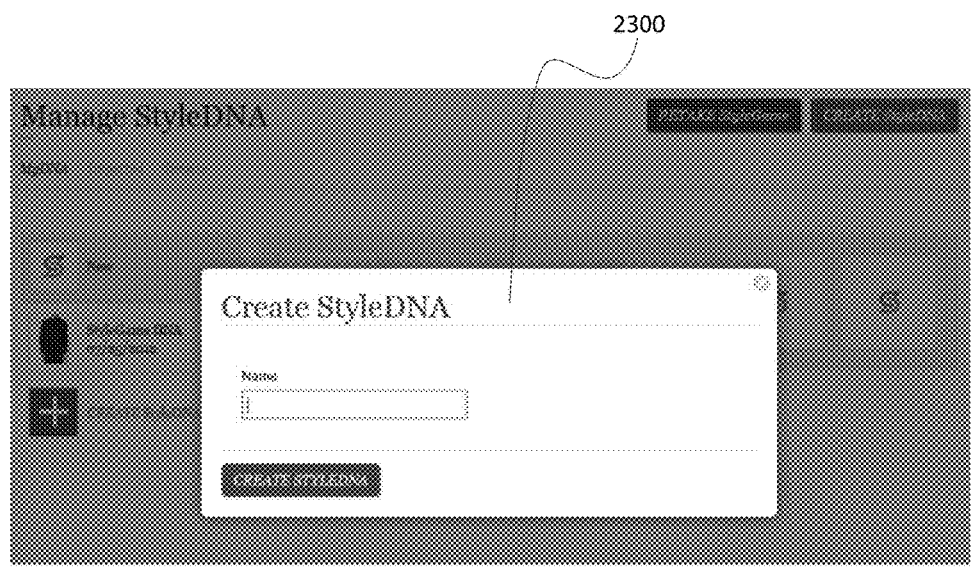
FIG. 16 is an exemplary screen shot of "Create StyleDNA" associated with the Manage StyleDNA user interface of FIG. 14 embodying principles of the invention.

The Manage StyleDNA module 2000 supports several functions. Referring to FIG. 15, at step 2200, a user may rename existing StyleDNA 40. Referring to FIG. 16, at step 2300, a user may create a new StyleDNA 42. At step 2400, a user may delete one or more of his stored StyleDNA 40. At step 2500, a user may retake the StyleGame 20 to create a new StyleDNA 42. At step 2610, a user may browse the pre-created StyleDNA 40 of others. Finally, at step 2620, a user may import the StyleDNA 40 of others. A user may also view StyleDNA 44 that has been created and publicly shared by other users.

Having developed an initial StyleGame StyleDNA 41, and recognizing that a user's style preferences may evolve or change as driven by various factors, including time, environmental factors, peer influence, media, magazines, family, lifestyle or other such influences, the method and system allows the user to modify his existing StyleDNA 40 at any time. The modification is performed by substituting an existing selected image 1225 with any other image 1225 within one or more image database 60. As a user identifies a desired image 1225, he can elect to make a substitution at any time. The system will then automatically update his StyleDNA 40 with a new set of images 1225 and a corresponding user vector 92. The method and system provides real-time functional interactive input by the user to change any or all of the images 1225 that drive and comprise his existing StyleDNA 40.

The method and system allows a user to create additional StyleDNA 40 specific to the user without abandoning either his first StyleGame StyleDNA 41 or other subsequently developed StyleDNA 40. The system allows a user to create a second new StyleDNA 42 from a blank template using any image within a StyleSeek database 60. As with creation of a first StyleDNA 41, the system provides a user interface associated with the StyleGame 20 wherein a user is provided searchable access to one or more database 60 of StyleSeek images. The user may then select one or more images 1225 to add to his StyleDNA 40 profile. In one aspect, six images 1225 are selected to generate a subsequent query to populate and implement one or more algorithms used in calculating a user's lifestyle input vector 92. Throughout the operation of the system, a user may remove or replace images 1225 at any time. With each change, the system dynamically creates an updated corresponding input vector 92 that overwrites the existing input vector 92. As a user creates one or more StyleDNA 40, individual StyleDNA 40 can be saved to a user's account profile.

Once a StyleDNA 40 has been completed, the system then allows a user to designate whether that StyleDNA 40 is eligible for sharing with other users. The owner user may click an option button to publish the image set associated with his or her selected StyleDNA 40 onto a public facing website, Shared StyleDNA 2630. When published, other users can copy the User-shared StyleDNA 44, incorporate the User-shared StyleDNA 44 within their own user profile, and add the User-shared StyleDNA 44 to their store of other StyleDNA 40. This may be accomplished by the Import StyleDNA function 2620 of the system. A user may elect to enable or disable sharing of his StyleDNA 40 at his discretion. In one aspect, any User-shared StyleDNA 44 previously shared and accessed by other users, will remain available to those users. In another aspect, once a user elects to stop sharing his or her StyleDNA 40, the system will automatically extract the previously shared StyleDNA 44 from other user accounts. Alternatively, the system will support updates of a User-shared StyleDNA that are offered to those users currently sharing the specific StyleDNA.

Before a user can incorporate a User-shared StyleDNA 44 in the user's own account, the system requires the user to import the User-shared StyleDNA 44 into the user's account profile using Import StyleDNA 2620 function. The system provides user access to a database of User-shared StyleDNA 44. The User-shared StyleDNA 44 are provided for access via Shared StyleDNA 2630 on a public facing Internet or web page. New or existing users may click an option button on the User-shared StyleDNA 44 page to import images and input vectors associated with other shared StyleDNA 44 into their personal accounts. Importation produces a local copy of the User-shared StyleDNA 44 in the user's account, allowing it to be used to create or modify existing StyleDNA 40, or, for sharing with others.

Preferences change; attitudes change; moods change which may affect preferences. Consequently, the system provides users with the option of selecting and activating any of their StyleDNA 40 at any time. At a main web page 420 of the StyleSeek website 400, a user can see all of the StyleDNA 40 vectors and image sets he has available for use. The user simply selects a StyleDNA 40 from his library to activate that StyleDNA 40. The activated StyleDNA 40 will then be used by the system as a basis for generating recommendations until the user changes and activates another StyleDNA 40

Figure 17:
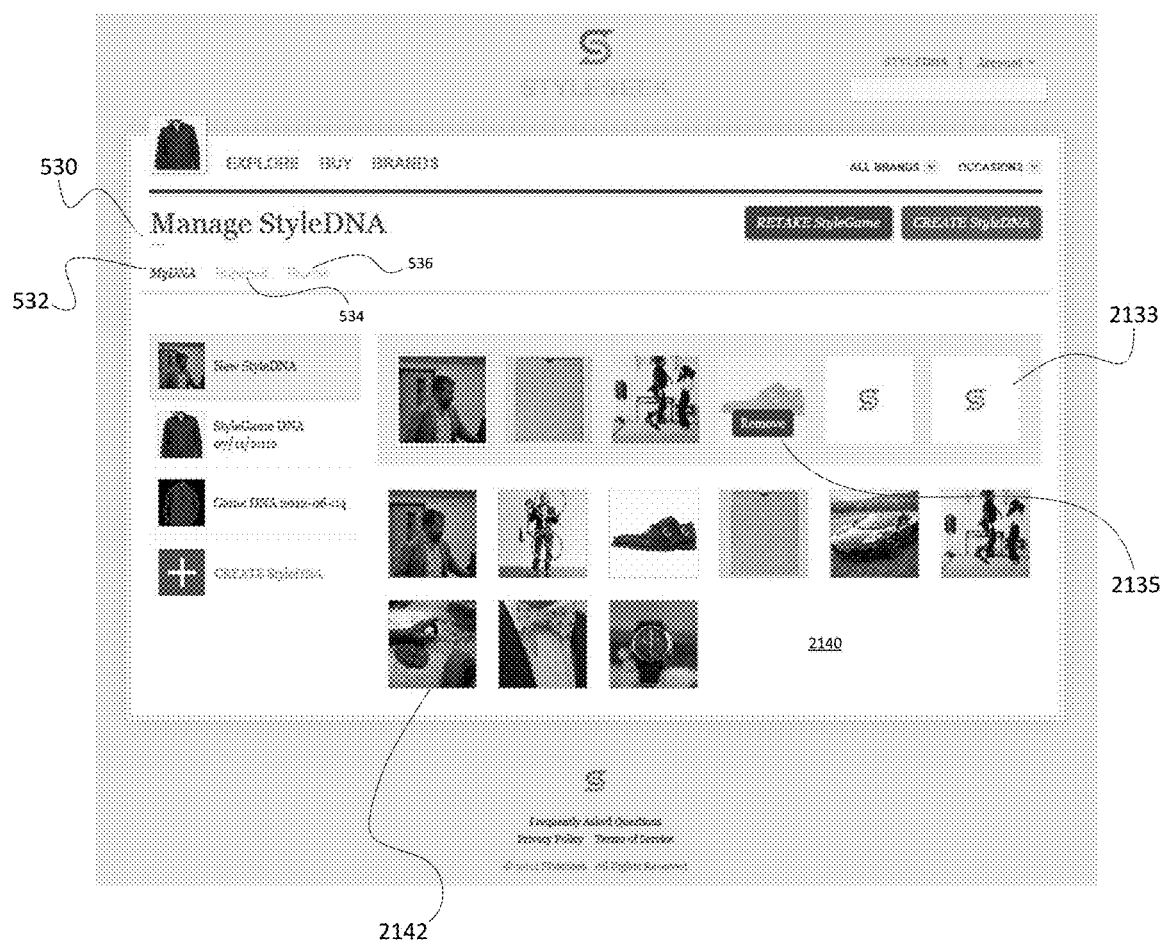
FIG. 17 is an exemplary screen shot of another view of the Manage StyleDNA user interface embodying principles of the invention.

Referring to FIG. 17, a user can create new StyleDNA 40 through two options accessible via the Manage StyleDNA page 530. In a first option, the user selects the "+" sign 2310. Alternatively, the user can click the "CREATE StyleDNA" button 2302 at the top right of the Manage StyleDNA page 530. Creating New StyleDNA 42 will create a blank StyleDNA template 2133 with six boxes. The user is then able to name the newly created StyleDNA 40 and customize the contents of the new StyleDNA 40 by selecting and dragging in any images 2142 from the MyDNA Holding Area 2140 on the page. The user can hover over images 2142 in the StyleDNA template 2133 to reveal a "Remove" button 2135. Selecting the "Remove" button will delete the image 2142 from the StyleDNA template 2133, returning it to the MyDNA Holding Area 2140 and leaving a blank box that may be filled with other images 2142 from the MyDNA Holding Area 2140.

Any image 1225 available through the databases 60 of the system can be added to the MyDNA Holding Area 2140 by clicking an "Add to MyDNA" button 3202 that appears when the user hovers over any image 1225 displayed by the system. The image 1225 is then converted and identified as a MyDNA Holding Area image 2142.

When an image 2142 is added to the MyDNA Holding Area 2140, it becomes immediately available for use in any of the user's existing or newly created StyleDNA 40. Images 2142 added to the MyDNA Holding Area 2140 do not influence a user's StyleSeek results until the user adds them to an existing StyleDNA 40 and activates the new/modified StyleDNA 40. Hence, a user can freely add any images 2142 to the user's MyDNA Holding Area 2140 as the user browses the system site. In addition, a user may delete any or all images 2142 from the MyDNA Holding Area 2140.

Referring to FIG. 2, in an alternative aspect, the method and system implements a set 94 of additional vectors to modify the application and comparison between the user vector 92 and item/brand/content vectors 93. For example, the method and system computes a separate MyDNA input vector 95 from an algorithmic aggregation of the images 2142 in the MyDNA Holding Area 2140. The system may then use the MyDNA input vector 95 to influence preferences presented to a user. The system will allow the MyDNA input vector 95 to be ascribed a lower, equal or higher weight than the aggregate user input vector 92 developed via the StyleGame 20. In an additional alternative aspect, the method and system tracks and correlates those images that are removed from the MyDNA Holding Area 2140 or from existing StyleDNA 40. These deleted images may then be used by the system to create an additional MyDNA deleted images input vector 96. Again, this deleted images vector 96 may be ascribed a lower, equal or higher weight than other vectors. The system may then be configured to apply any of these vectors with differing weight during the correlation step to refine preferences presented to a user. Still further, in another alternative aspect, the user vector 92 may be adapted by the system to be address and consider a user's specific likes and dislikes. The user may indicate specific images or items as liked or disliked, such indications tracked by the system in a like filter vector 97 and a dislike filter vector 98. Other filter vectors 99 may be likewise be applied for other types of filters and processed by the system during the refinement of preferences and before display of recommendations back to the user.

Figure 21:
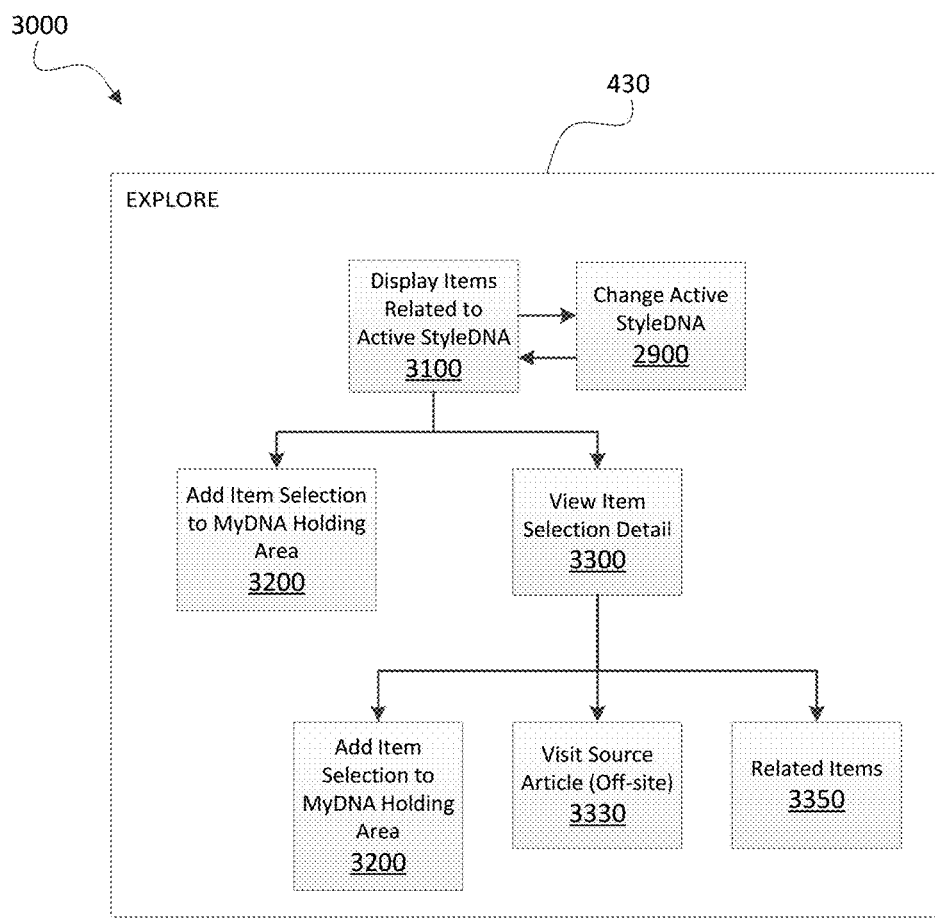
FIG. 21 is a functional block diagram of the Explore module embodying principles of the invention.

EXPLORE Module—Now referring to FIG. 21, the structure, function and operation of the EXPLORE module 3000 is disclosed. By selecting the EXPLORE page tab 430 on the main StyleSeek web page 420, the Display Items Related to Active StyleDNA function 3100 is invoked, presenting the user with a selection of blog posts and reviews which the system has scoured and aggregated from across the Internet. The method and system personalizes the presented selections according to the user's currently active StyleDNA 40. Selection of the EXPLORE page tab 430 by the user triggers the presentation to the user of a personalized digital magazine 3105 wherein all the images and articles are selected specifically for the user based on his StyleDNA 40. At step 296, the user may change the currently active StyleDNA 40 if he wishes to view a display of items selected with a different StyleDNA 40.

Also, as elsewhere within the StyleSeek website 400, while active within the EXPLORE module 3000, the user may elect to add items 1225 to the MyDNA holding area 2140.

Further, the system allows a user to view additional detail for a selected item. Selecting any item within the personalized digital magazine 3105 on the EXPLORE page 430 displays an item detail page 432 providing additional information concerning the item. By selecting and invoking View Item Selection Detail function 3300, an item detail page 432 is presented containing a diverse set of information related to the selected item. In one aspect, the item detail page 432 contains relevant pictures, one or more short excerpts from relevant blog posts, and/or one or more links to the full text of each blog post or related items. The system supports delivery of multiple forms of content on the item detail page 432 including published articles, magazine reviews, detailed specifications and other narrative, graphic or descriptive content.

Again, as the user views detail associated with a selected item, any item from that detailed view may likewise be added to the MyDNA holding area 2140. This immediate functionality allows a user to lever subliminal or visceral response to the item and consider it for future use in his or her StyleDNA 40. Further, the user may select and invoke the Visit External Source Articles Offsite function 3330 to access external articles outside the primary StyleSeek website 400. Additionally, a user may view Related Items 3350.

Figure 22:
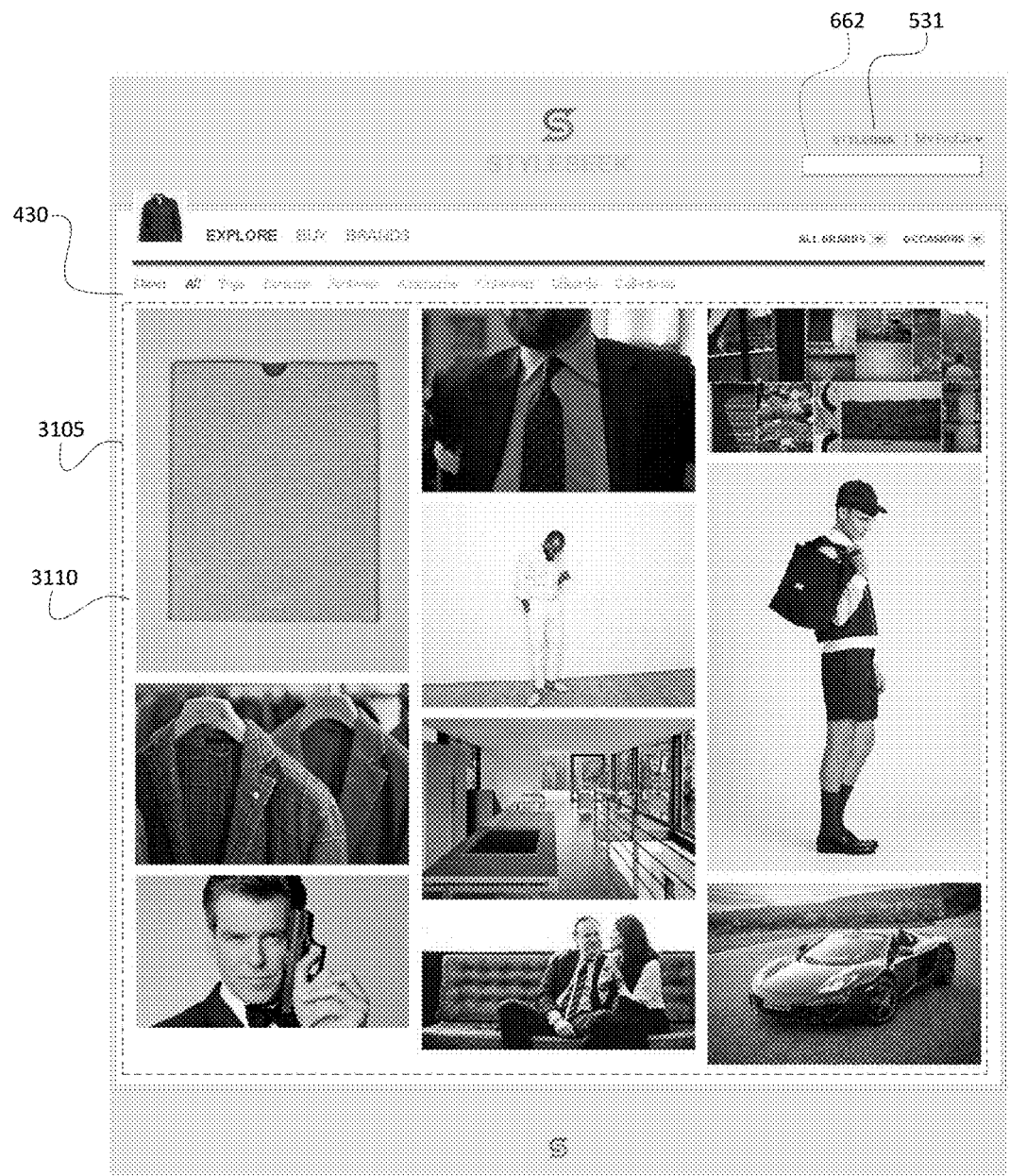
FIG. 22 is an exemplary screenshot of the Explore user interface embodying principles of the invention.

FIG. 22 is an exemplary screen shot of a representative StyleSeek main web page 420 illustrating a personalized digital magazine 3105 with display of personalized items 3110 to a user.

Figure 23A:
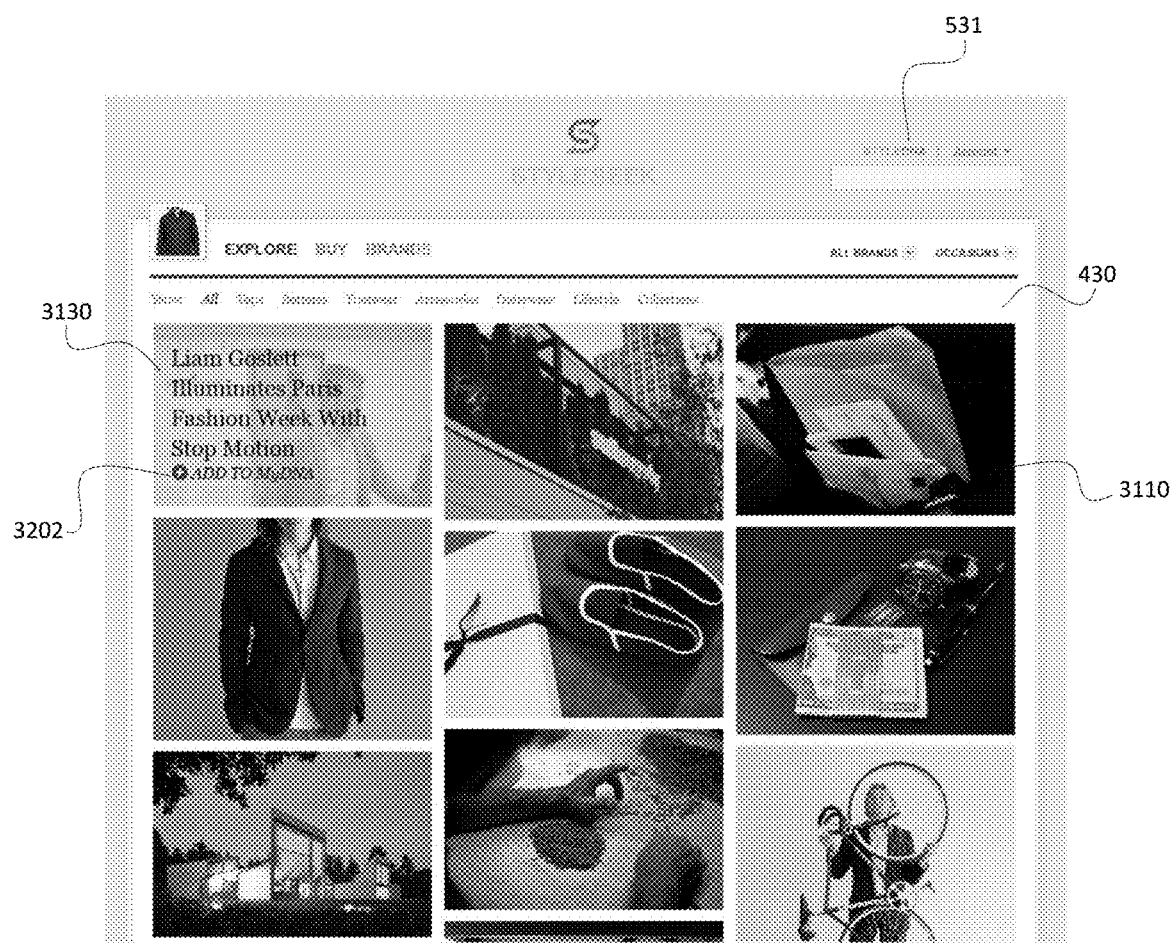
FIG. 23A is an exemplary screenshot of the Explore user interface wherein a user has hovered a pointer over a particular item embodying principles of the invention.
Figure 23B:
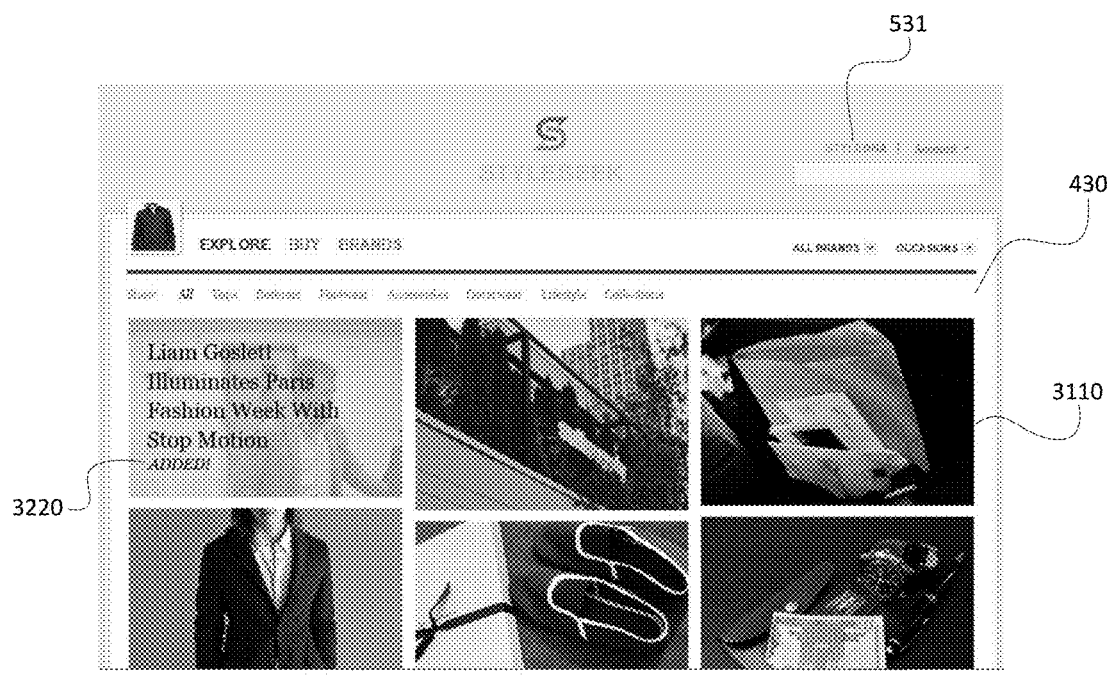
FIG. 23B is an exemplary screenshot of the Explore user interface wherein a user has selected the item hovered over in FIG. 23A and added the item to his MyDNA account embodying principles of the invention.

Now referring to FIG. 23A and FIG. 23B, while still within the EXPLORE page 430, a user may hover his pointing device over any item image to trigger an overlay 3130 displaying a headline relative to the content of the image and an option to add the image to the user's MyDNA. The user may then elect to add the image to the MyDNA Holding Area 2140 by selecting "ADD TO MyDNA" 3202, which invokes the Add Item Selection to MyDNA Holding Area function 3200. As shown in FIG. 23B, the system will notify the user that the particular item has been added to the MyDNA Holding Area 2140 by changing the overlay 3130 to show the text "ADDED!" 3220 in place of "ADD TO MyDNA" 3202.

Figure 24:
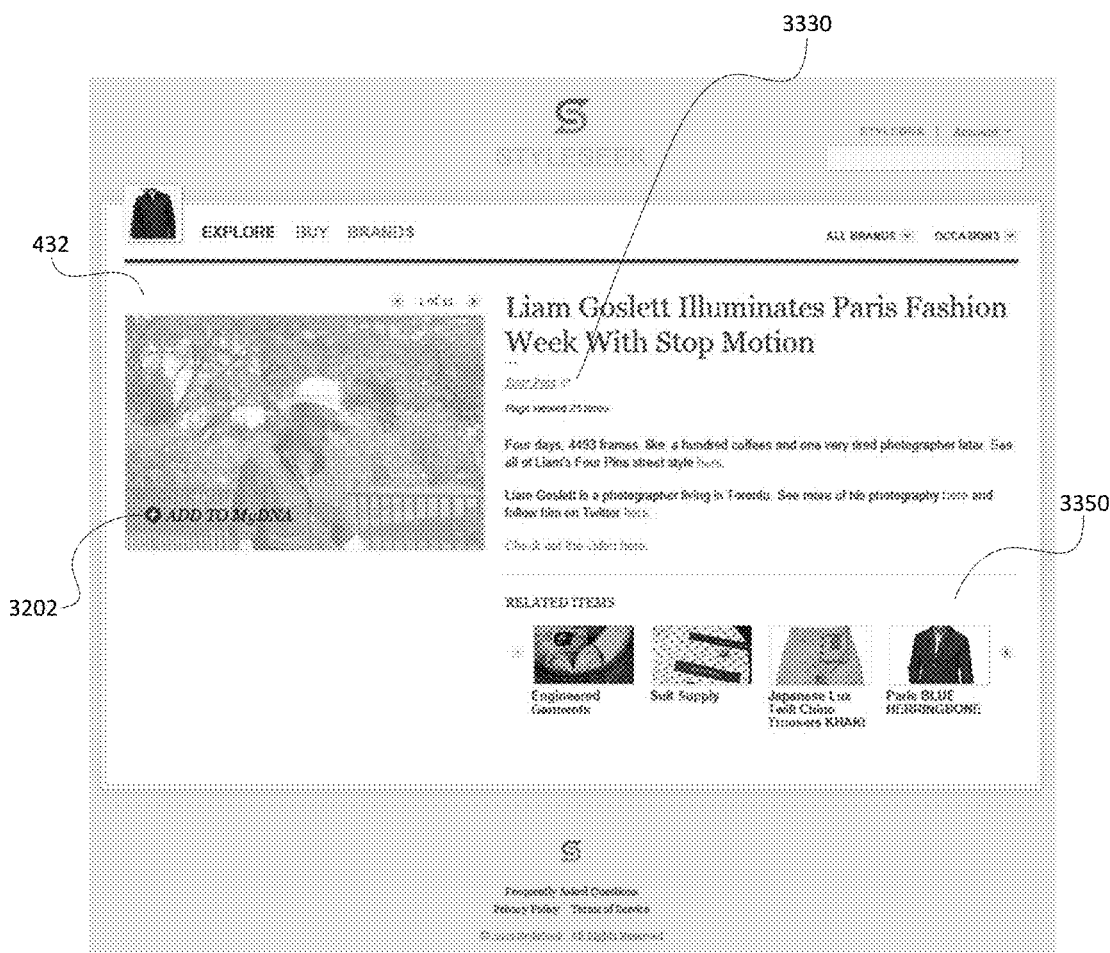
FIG. 24 is an exemplary screenshot of the detail page associated with the item added to the user's MyDNA account of FIG. 23A embodying principles of the invention.

Now referring to FIG. 24, while still within the EXPLORE page 430, the user may also elect to explore the item detail page 432 and then select and add an item from that page to the MyDNA holding area 2140. The user may also elect to drill down into other elements such as the Visit Source Article Offsite hyperlink 3330 or view Related Item 3350, which will provide additional opportunities to add items to the MyDNA holding area 2140.

The functionality associated with the EXPLORE page 430 allows a user to freely explore and drill down throughout items displayed and continuously acquire images of items and add to the MyDNA Holding Area 2140 at any time. This continual ability to acquire images representative of a user's lifestyle preferences at any time allows the system to adapt and leverage the user's visceral response to images and content.

EXPLORE Blog Browse—A user may also buy products from blog posts presented via the EXPLORE page tab 430. Note that the system allows a user to buy products from any content or article delivered to the user, including but not limited to email or text messages. When reviewing articles in a blog post, relevant brands and products are presented to the user in a "Related Items" section 3350 of the Explore page. When a product is available for purchase, the system will list the item in this the Related Items section 3350. A user may then elect to pursue purchase of the item by clicking on the image of the item of interest. Then, as before, the system navigates the user to a specific product page where the user can purchase the item without further interaction from the StyleSeek system. Again, the separation between the StyleSeek system and the product sellers ensures that the algorithmic and database aspects of the method and system may remain pure and untainted by other non-stylistic influences from retailers or vendors of the various products or services.

Figure 25:
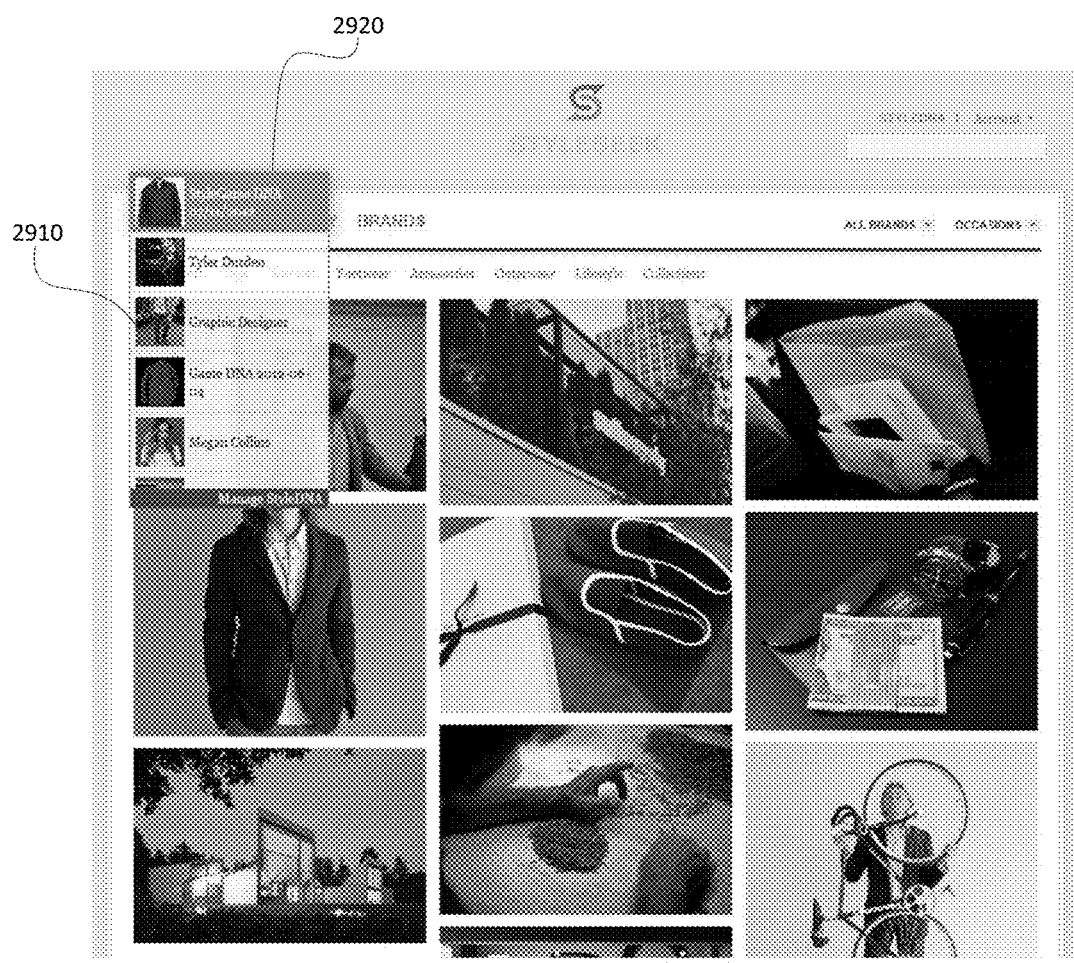
FIG. 25 is an exemplary screenshot of the user interface dropdown for Manage StyleDNA to allow a user to change StyleDNA.

Now referring to FIG. 25, the system provides a means to allow a user to identify the currently active StyleDNA 40, and, to change from one StyleDNA 40 to another StyleDNA

40. In an upper left corner of the main web page 420, a smaller clickable image 2852 is presented. The clickable image 2852 represents and correlates to the user's currently active StyleDNA 2920, which is used by the system to personalize the user's experience. By selecting the clickable image 2852, the system causes a separate dropdown list 2910 to be presented to the user. The dropdown list 2910 presents icons for all the StyleDNA 40 currently in the user's account. The user can elect to select and activate another of his existing StyleDNA 40 from the dropdown list 2910. Alternatively, he may select the option, Manage StyleDNA, which will launch him to the "Manage StyleDNA" page 530 to further change or customize one or more of his StyleDNA 40.

Figure 27:
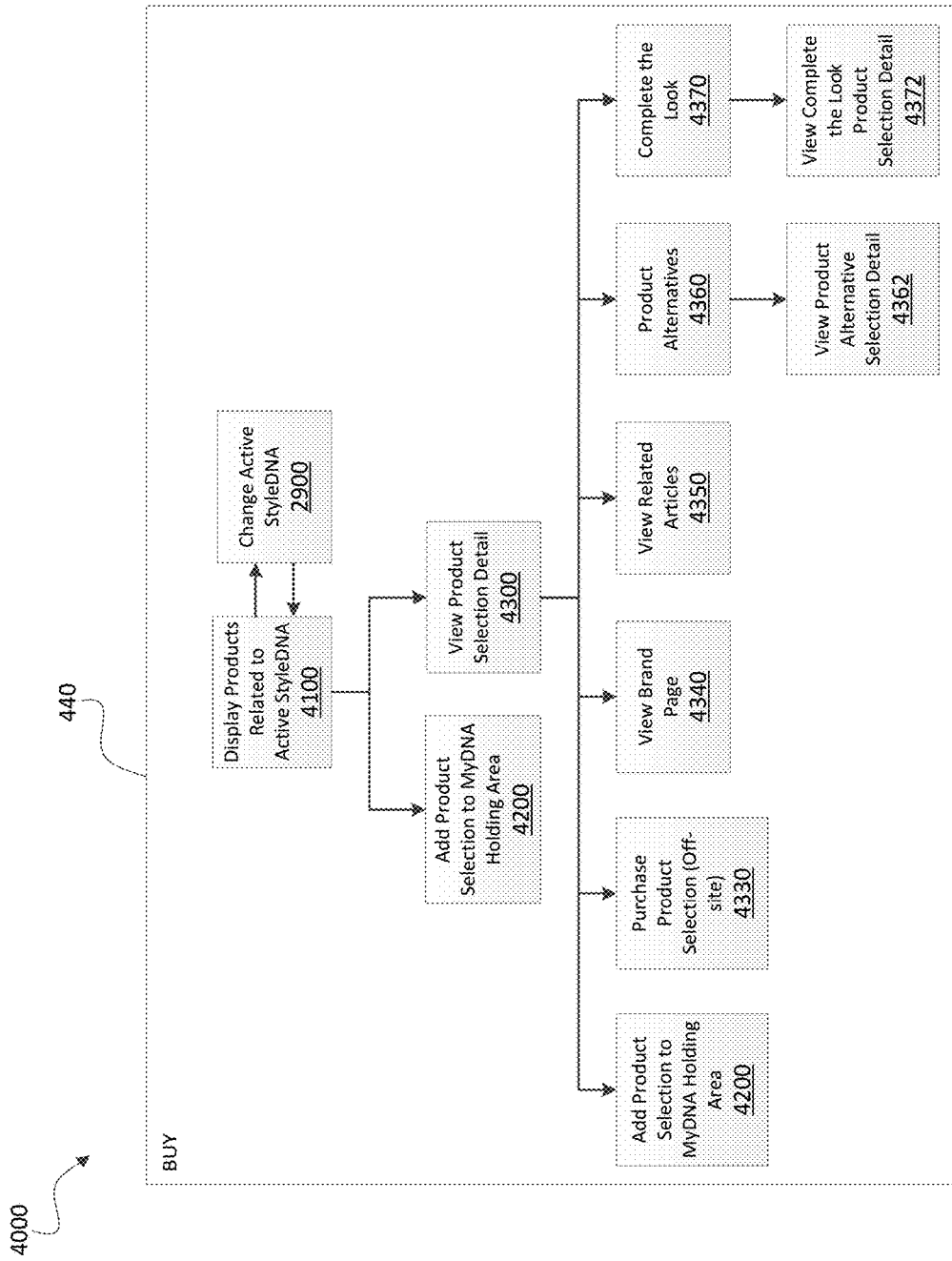
FIG. 27 is a functional block diagram of the Buy module embodying principles of the invention.
Figure 28:
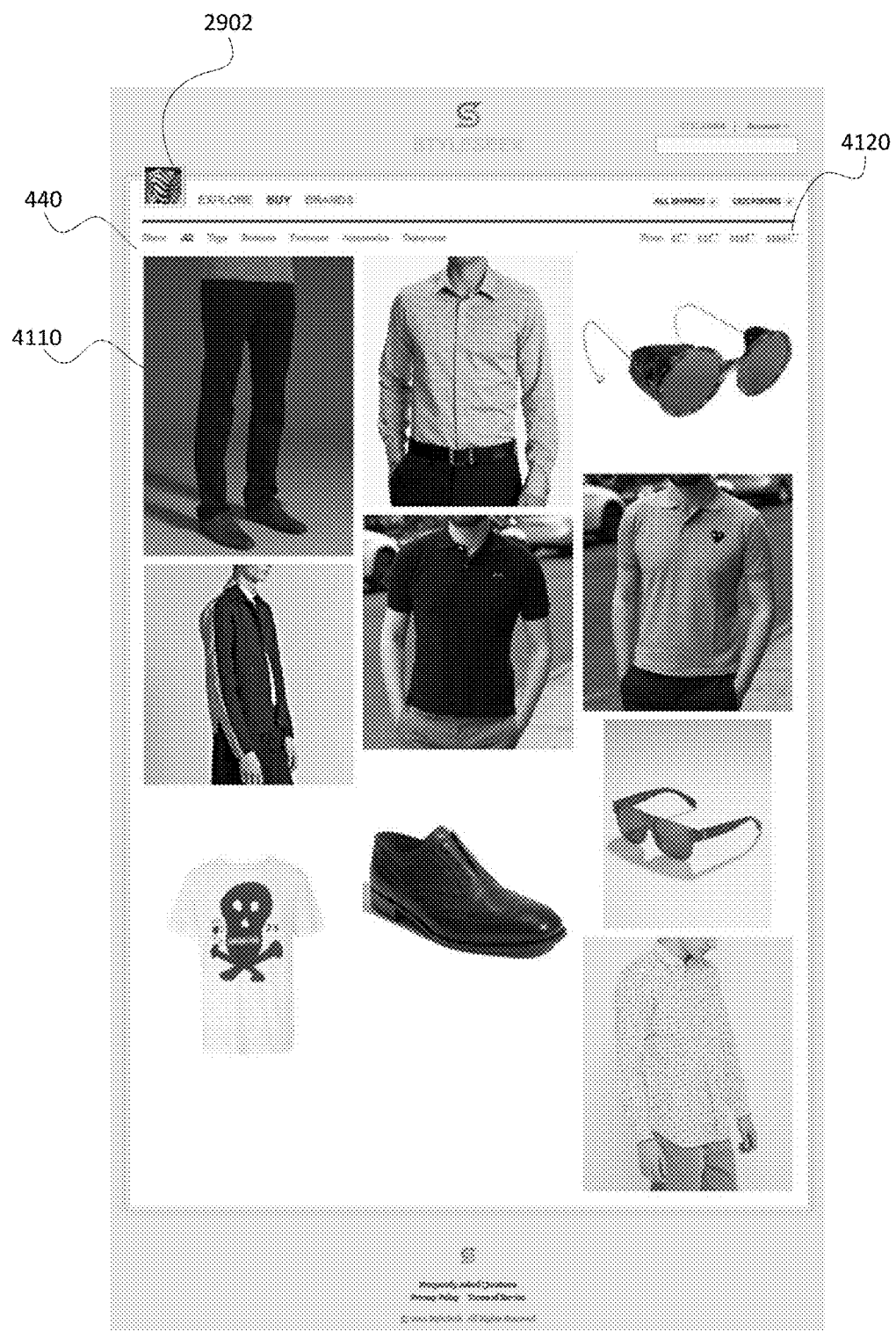
FIG. 28 is an exemplary screenshot of the Buy user interface embodying principles of the invention.

BUY Module—Now referring to FIG. 27 and FIG. 28, the function and operation of the BUY module 4000 is disclosed. The selection of the BUY web page tab 440 causes the presentation of a new web page that invokes the Display Products Related to Active StyleDNA function 4020, displaying product items 4040 available for purchase based on the user's unique StyleDNA 40. These products are generally presented in a manner that allows them to be purchased immediately via an e-commerce portal associated with the product. The user can directly add an item to the user's MyDNA Holding Area 2140 by hovering over the product item 4040 and invoking the Add Product Selection to MyDNA Holding Area function 4200. Clicking an item on the BUY web page 440 invokes the View Product Selection Detail function 4300 and displays a full product detail page 442, where a user is presented with additional detail about the item, including price alternatives, product reviews, and where the item might be purchased. The user may select a View Brand Page link 4340 to view the page associated with the particular brand of the selected product.

Related Articles—Referring to FIG. 27, the method and system provides functionality that allows a user to browse and view related blogs posts, articles, reviews and other content in a "Related Articles" area 4350 displayed on individual full product detail pages 442. Related articles may be displayed based on similarity in style of the article topics to the selected product or other criteria describing specific user interests and lifestyle preferences.

Product Alternatives—Referring again to FIG. 27, the method and system also provides functionality that allows a user to browse and view alternative products in "Product Alternatives" 4361 displayed on individual full product detail pages 442. Alternative products are defined herein as products that are very similar in style to the selected product, but are available in different price ranges. The "Product Alternatives" area 4361 of an individual full product detail page 442 includes other items of the same basic type (for example, pants, belts, or jackets) as a selected product that are deemed by the function 4360 of the method and system to be related in style to the selected product. In one aspect, alternative products are arranged and presented to a user by price, arranged low to high. In another aspect, the alternative products are filtered to display products in a desired price range selected by the user. Thus, the system allows a user to explore various items without concern for price, and then later, adapt recommendations and selections to conform to a predetermined price range. Likewise, an additional aspect of the system allows a user to create a StyleDNA 40 without considering price.

Complete The Look—Referring again to FIG. 27, the system provides a Complete the Look function 4370 to allow a user to select additional products to complement their existing stylistic configuration. A "Complete the Look" area 4371 of an individual full product detail page 442 includes other items that are deemed by the Complete the Look function 4370 of the method and system to be related in style to a selected product. The method and system applies a user's StyleDNA 40 to identify other correlated items that are deemed to pair well with a product currently under review by the user. For example, the system may present a pair of pants for consideration to the user wherein those pants have been deemed to stylistically complement and correlate with a pair of shoes the user is contemplating. In one aspect, the system includes and presents items in the "Complete the Look" area 4371 that are in the same relative price range as the main product being viewed by the user. The user can refresh the recommendations in "Complete the Look" 4371 by clicking the Refresh button within that section, or by refreshing the web browser. This refresh causes the system to present a new set of correlated items deemed to pair with the item currently under consideration. This rapid refresh of alternatives once again allows a user to leverage their visceral response to images to continually transform and evolve their StyleDNA.

Price Filtering—Referring to FIG. 28, the system also allows a user to modify or normalize their StyleDNA 40 to the user's desired price range. The system provides two alternatives to filter presented products by price range. First, when in the BUY web page 440, the user can check one of the price filter options 4120 at the top right hand corner of the page. The price filter options 4120 are presented as $, $$, $$$, and $$$$, where a single $ represents the lowest price, ranging to the highest prices represented by the $$$$. Second, the system allows a user to filter by price on an individual product page using the same selection criteria. This filtering functionality delivered by the system allows the user to browse through the Product Alternatives 4362 to view items of the same style in a price range acceptable to the user.

Figure 29:
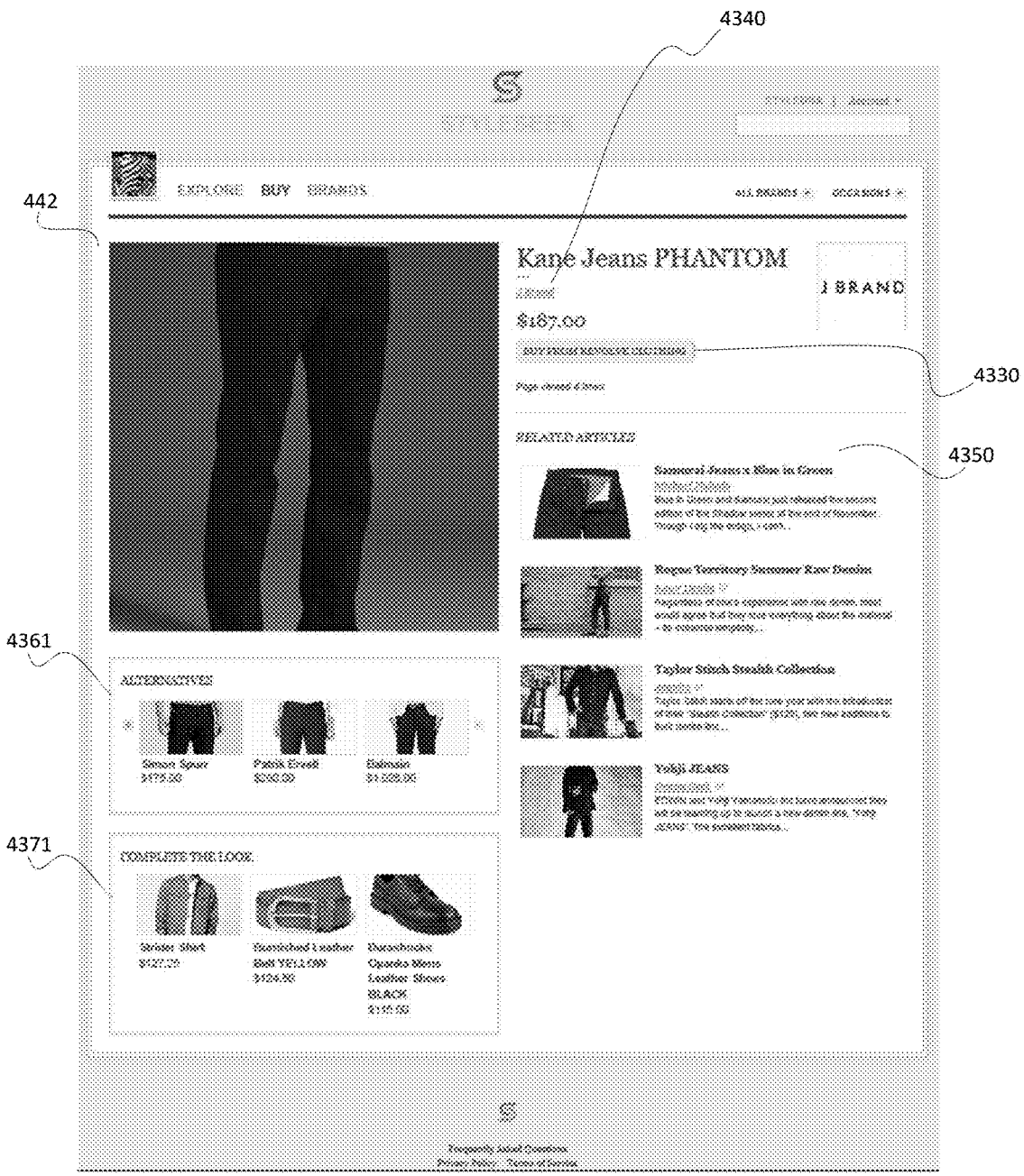
FIG. 29 is an exemplary screenshot of the detail page for an item selected from the Buy user interface of FIG. 28 embodying principles of the invention.

Now referring to FIG. 29, in greater detail, shown on the full product detail page 442 is a section referred to as the Complete the Look area 4371, displaying results of the Complete the Look function 4370. This area displays to the user other items that the system deems related in style to a selected product and expects to pair well with that product. Items displayed to the user in the Complete the Look 4371 area are selected by the system to fall in the same price range as the main product the user is viewing. The user may select an item to activate the View Complete the Look Product Selection Detail function 4372 and display the full detail page for the item. Another function activated when a user visits the full product detail page 442 is Product Alternatives 4360. The Product Alternatives area 4361 of the product detail page 442 displays to the user other products of the same type deemed by the system to be very similar in style to the selected product and of potential interest to the user. The user may select an item to activate the View Product Alternative Selection Detail function 4362 and display the full detail page for the item.

Vendor Neutrality—Referring to FIG. 27 and FIG. 29, when viewing individual full product detail pages 442 on the StyleSeek site 400, the user selects and clicks a buy button 4330, which is typically presented to the right of the product image, to connect directly with the seller of the product. Upon connection with the product seller, the user may elect to complete a purchase of a recommended product. The method and system is implemented in a manner that maintains neutrality in recommendations to users to ensure that any recommendations are driven by user-centric preferences and not vendor-centric sales preferences. Hence, to maintain this neutral position on product selection and matching to users, the system is designed to connect users directly with the sellers of products of interest. Consequently, since the method and system are neither driven nor influenced by a desire to reduce existing product inventory, the method and system ensures purity in its recommendations, independent of current economic drivers. Consequently, the method and system provides direct connectivity to sellers. Of course, in another aspect, the system may be configured to provide recommendations limited to certain brands, thus supporting the use of the system as a marketing tool for a specific retailer or designer.

Figure 30:
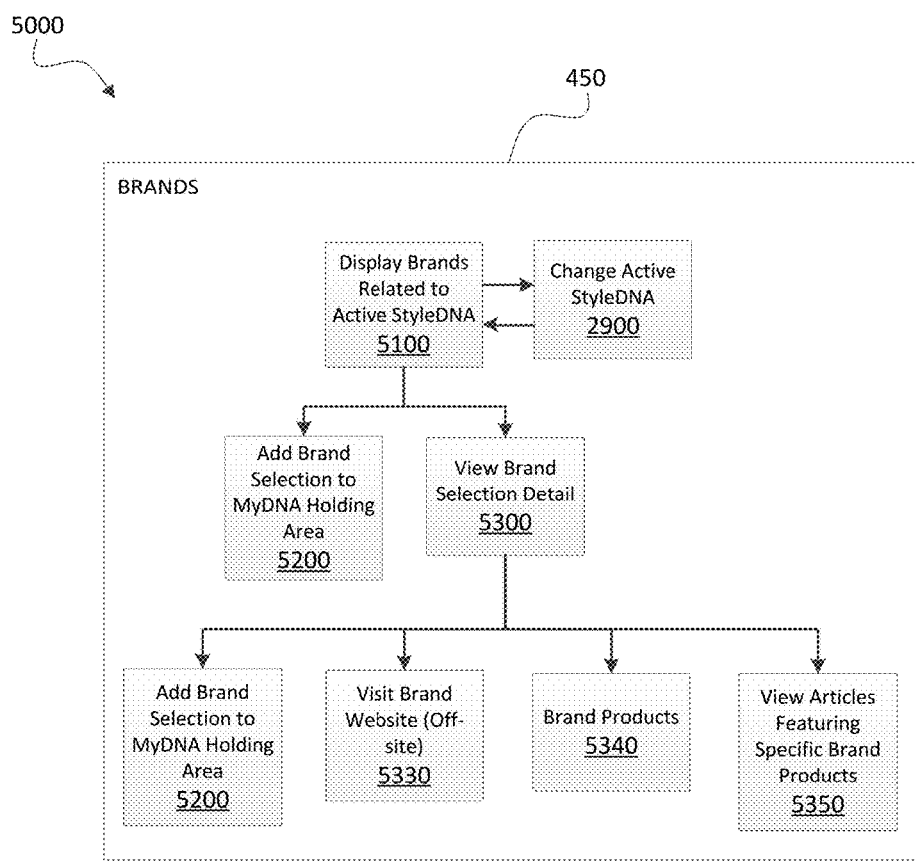
FIG. 30 is a functional block diagram of the Brands module embodying principles of the invention.
Figure 31:
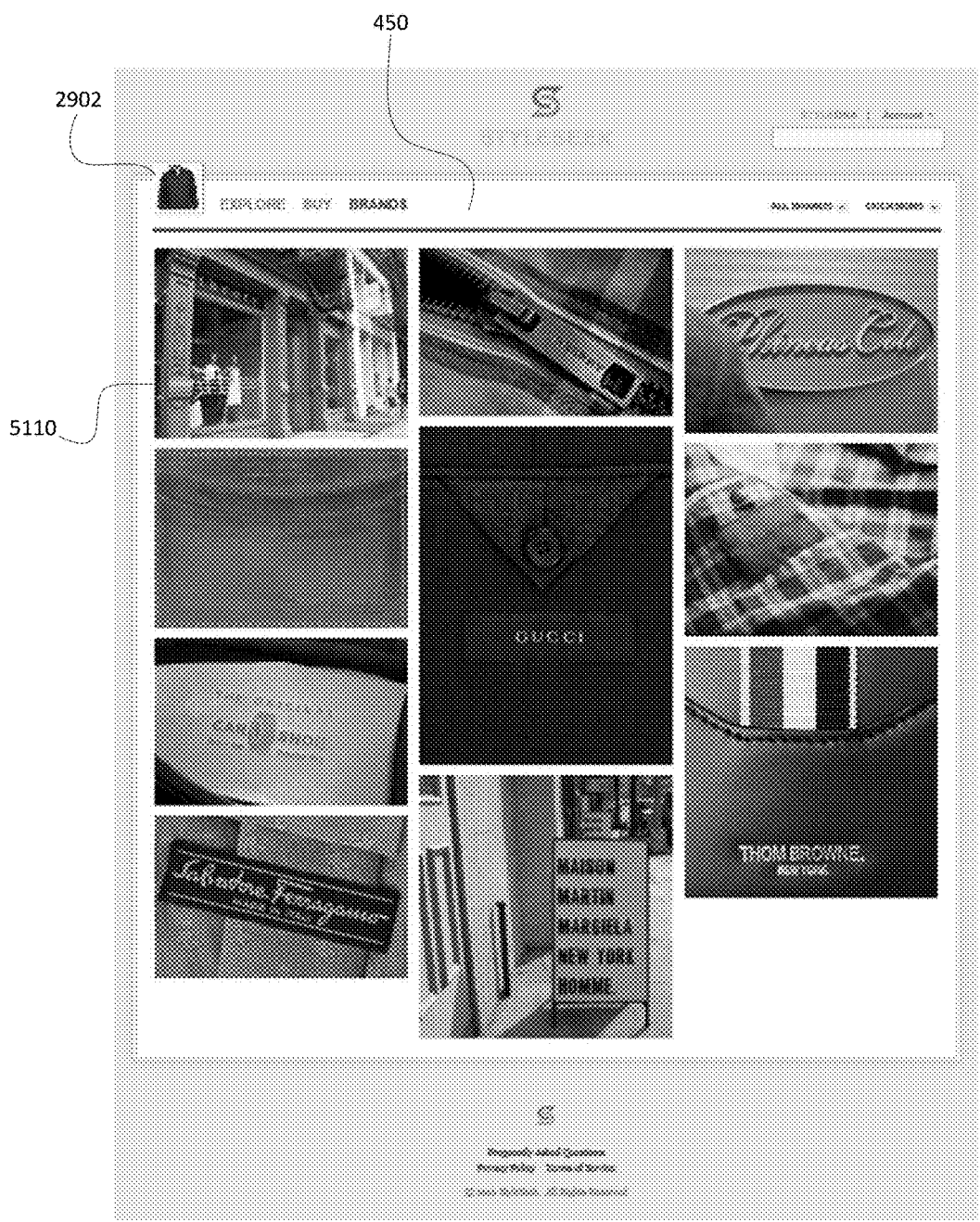
FIG. 31 is an exemplary screenshot of the Brands user interface embodying principles of the invention.

BRANDS Module—Next, referring to FIG. 30 and FIG. 31, the function and operation of the BRANDS module 5000 is disclosed. Selection of the BRANDS web page tab 450 activates the Display Brands Related to Active StyleDNA function 5100, causing the system to display an assortment of brands which the method and system have deemed most relevant to the user's style, based upon the user's unique StyleDNA 40. The user can directly add an item to the user's MyDNA Holding Area 2140 by hovering over the brand item 5110 and invoking the Add Brand Selection to MyDNA Holding Area function 5200. Selecting and clicking any brand item 5110 will activate the View Brand Selection Detail function 5300, displaying the item's own brand detail page 452 that includes representative collages, blog reviews, and products.

Figure 33:
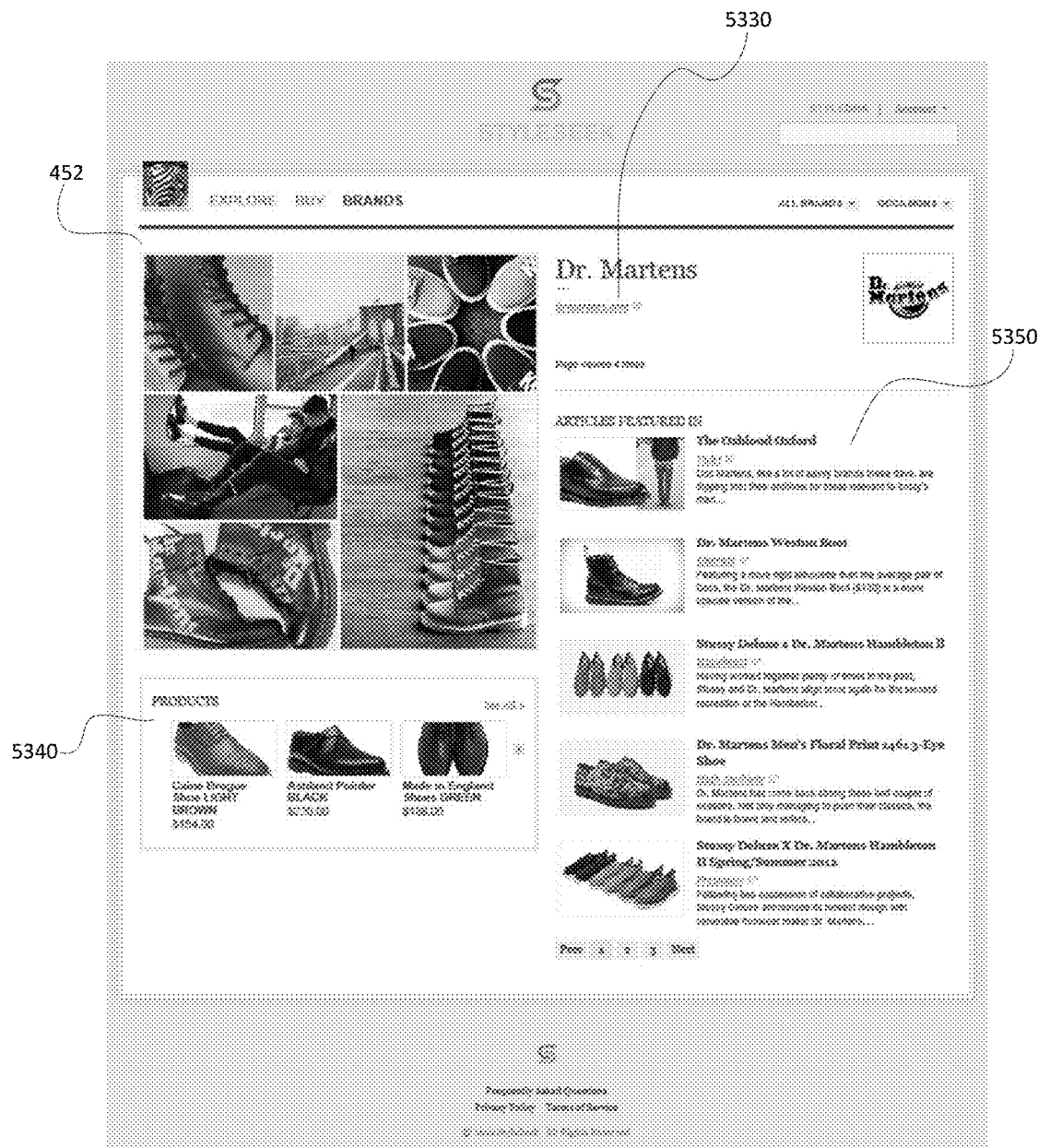
FIG. 33 is an exemplary screenshot of the detail page for a particular representative brand embodying principles of the invention.

Referring to FIG. 33, the brand detail page 452 presents the user with further information about the selected brand, as well as several functions. The user may select a Visit Brand Website hyperlink 5330 to access the external website, if available, associated with the selected brand. Furthermore, the brand detail page 452 contains sections for Brand Products 5340, displaying images with information and links to product detail pages 442 for products of the selected brand. Also shown is a section allowing the user to View Articles Featuring Specific Brand Products 5350, which aggregates links to articles from the site related to the selected brand.

Figure 26:
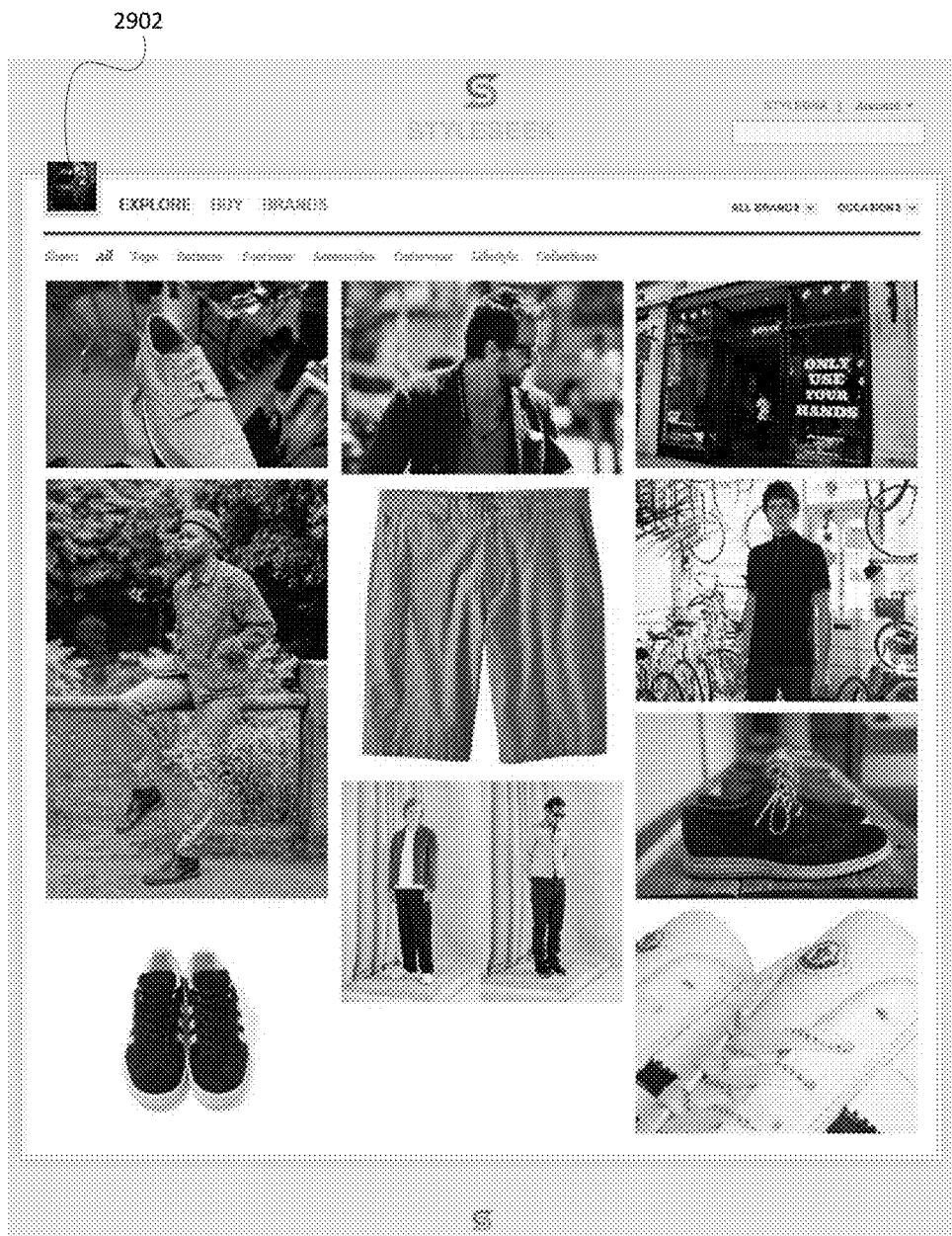
FIG. 26 is an exemplary screenshot of the new Explore user interface after the user has selected a new StyleDNA from the dropdown of FIG. 25 embodying principles of the invention.

Active StyleDNA and Personalization—A user is able to manage his StyleDNA 40 throughout the StyleSeek website 400. Referring to FIG. 26, we show an exemplary screen where the user has selected and activated a different StyleDNA 40, and thus, the image associated with that particular StyleDNA 40 is now shown in the clickable image 2852 as the currently active StyleDNA 40. In addition, the display of items 3110 displayed to the user has likewise changed to reflect the activation of the other StyleDNA 40.

To further manage his StyleDNA 40, the user may also select a StyleDNA link 531 above the search bar on the main StyleSeek web page 420, or from any page globally on the website, to access the Manage StyleDNA page 530.

The resulting StyleDNA 40 developed by the method and system through interaction with a user personalizes the user's StyleSeek experience. The user's StyleDNA 40 tells the system what products and content are likely most relevant to display to the user. In one aspect, a user's StyleDNA 40 is represented by six images. These six images are determined by the system to be the six strongest graphical representations of the user's personal style, selected from the system's database of items or products. In additional aspects, a user can select more than six images to represent the user's individual style. Additionally, the method and system likewise allow a user to create and experiment with alternative images to create additional StyleDNA 40.

Import StyleDNA—Referring to FIG. 13, the method and system provides software functionality to allow a user to browse and import one or more Pre-created StyleDNA 43 into his account 700. Once imported, additional StyleDNA 40 can be activated and used to browse the StyleSeek system for content, products, and brands reflective of that Pre-created StyleDNA 43. Pre-created StyleDNA 43 can be based upon personal or speculative preferences of real or fictional characters such as Kanye West, Indiana Jones, Mike Tyson, an Ivy-league university professor, a southern California surfer, current or past Presidents, or other such notable personas or individuals. When leveraging an imported StyleDNA 40, a user is able to view the entire StyleSeek website 400 and have a user experience as if the user were viewing the StyleSeek website 400 through the eyes of the person who created or is represented by the imported StyleDNA 40. By enabling this experience, the method and system viscerally and subliminally allows a user to refine his personal preference, which may influence the creation, modification or refinement of his StyleDNA 40.

Figure 18:
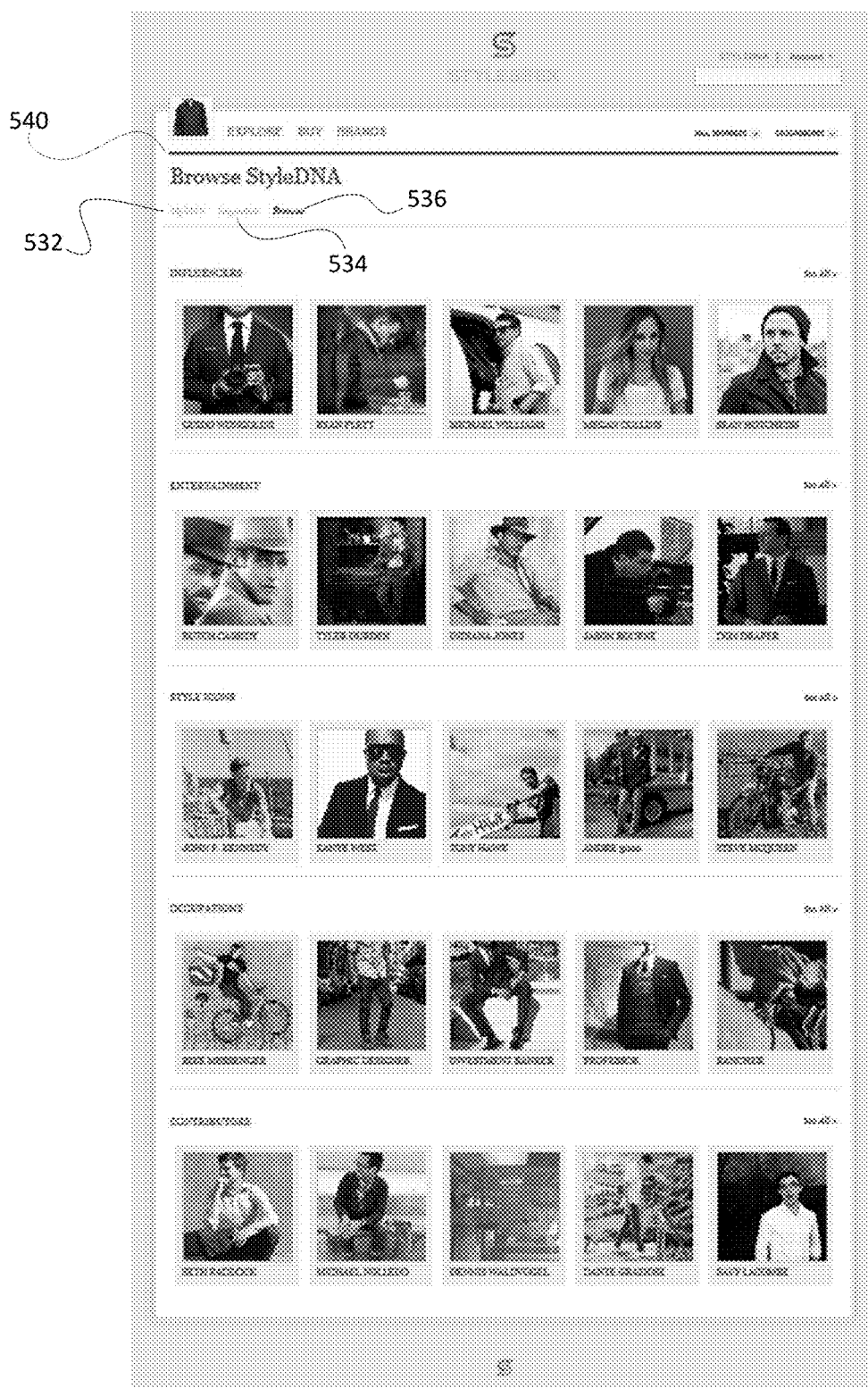
FIG. 18 is an exemplary screen shot of the Browse StyleDNA module user interface embodying principles of the invention.
Figure 19:
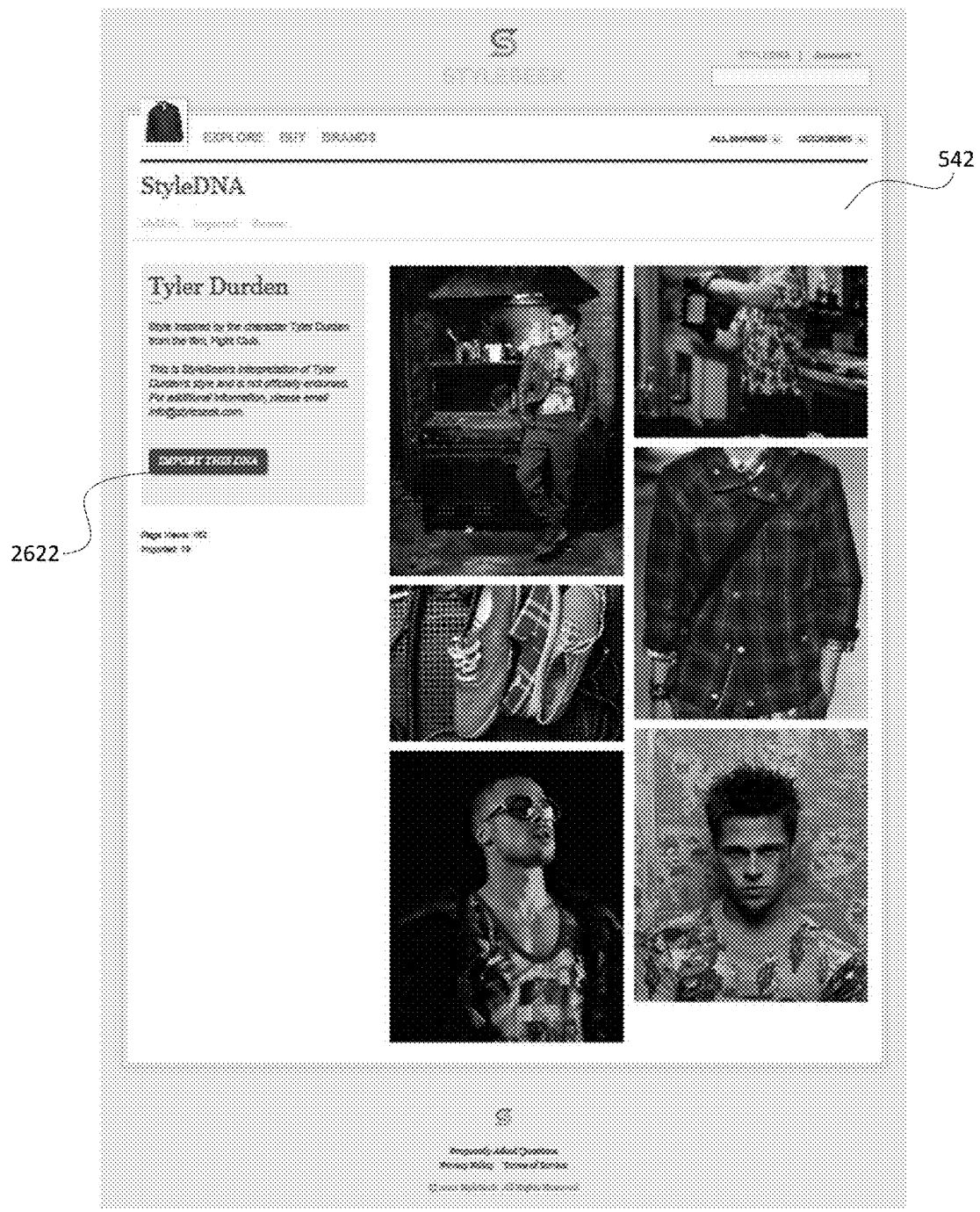
FIG. 19 is an exemplary screen shot of the detail for another user's StyleDNA selected from the Browse StyleDNA module user interface embodying principles of the invention.

To import a Pre-created StyleDNA 43, a user navigates to his Manage StyleDNA page 530 and clicks "Browse" 536 to view a variety of importable Pre-created StyleDNA 43 profiles that the user can select for activation. Selecting the Browse link 536 launches the user to a new Browse web page 540, as shown in FIG. 18. The user clicks on any profile that interests him to view its full importable Pre-created StyleDNA 43 in a Browse selection detail page 542, shown in FIG. 19. If the user still wishes to import the specific Pre-created StyleDNA 43, the user clicks the "Import this DNA" button 2622 to import the new Pre-created StyleDNA 43 to the user's account 700. All imported StyleDNA 40, whether Pre-created StyleDNA 43 or Shared StyleDNA 44, are contained separately within the Imported StyleDNA module 2120. StyleDNA 40 in Imported StyleDNA 2120 can be activated and used to browse the StyleSeek system, but cannot be modified by the user.

Figure 20:
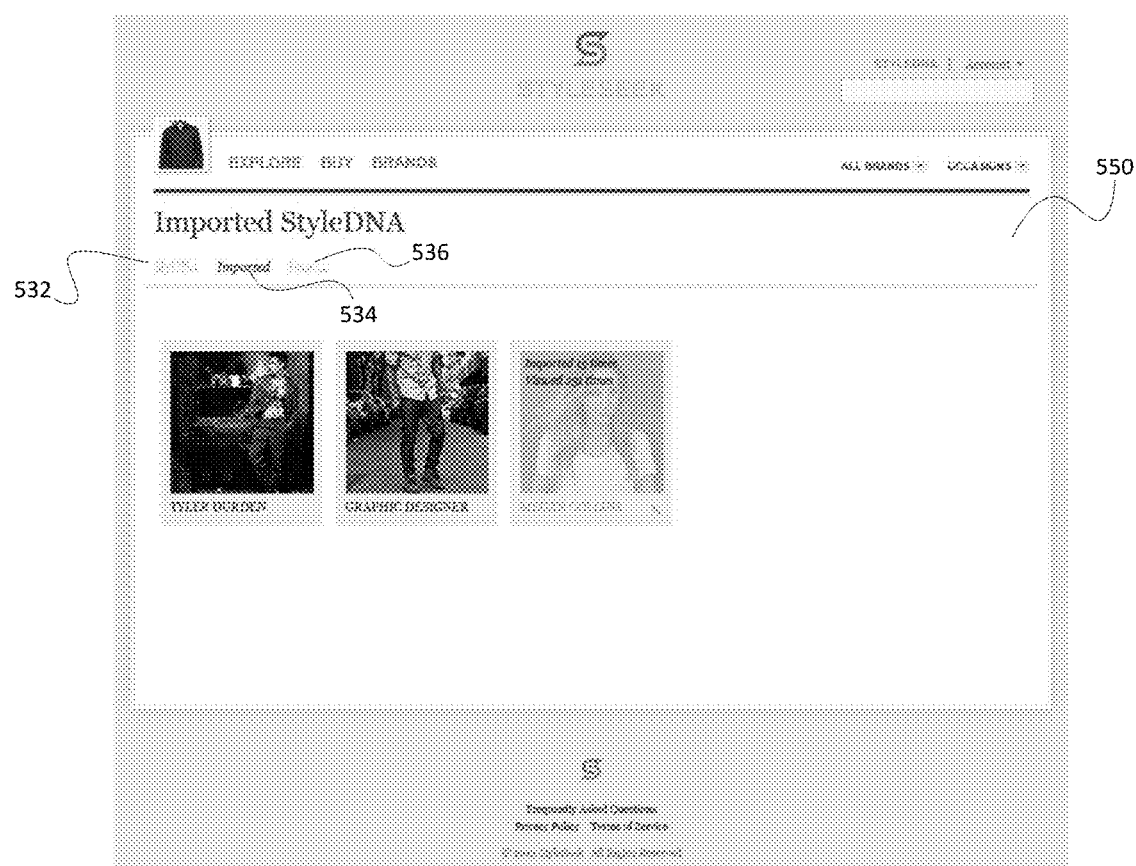
FIG. 20 is an exemplary screenshot of the Imported StyleDNA user interface embodying principles of the invention.

Referring to FIG. 20, the imported StyleDNA 40 will appear in the imported web page 550 of the user's Manage StyleDNA 530 page. The user can access the Imported web page 550 by selecting the Imported link 534 from within the StyleDNA site section 510. Once imported, the imported StyleDNA 40 can be activated to start browsing the StyleSeek system and application as that imported profile. The imported StyleDNA 40 may also be selected and viewed in full by the user in an Imported selection detail page 552. From other sections or pages of the StyleDNA site section 510, the user may select the MyDNA link 532 to return to the Manage StyleDNA page 530.

As with the user's original StyleDNA 40 inventory, a user may activate any imported and saved StyleDNA 40 by selecting the same image 2852 at the top left hand of the StyleSeek main web page 420. Selecting the clickable image 2852 causes the presentation of a dropdown list of the user's available StyleDNA 40, including any Pre-created StyleDNA 43 and User-shared StyleDNA 44, from which the user can select any StyleDNA 40 and immediately be presented with updated results from the system.

A user can likewise share any of his own StyleDNA 40 with other users of the StyleSeek community. A user shares one or more of his StyleDNA 40 by first selecting any of the StyleDNA 40 listed on the user's Manage StyleDNA page 530 and then selecting the option to share the selected StyleDNA 40.

The user invokes the function 3200 by clicking the button 3202 to add items to the user's MyDNA holding area 2140, or, as the user adds and changes any images associated with his StyleDNA 40, the system immediately provides access for the user to purchase the products associated with the images of any of the items he may have just added. This feature of the system supports the ability to satisfy the whims of the user, when circumstances, emotions or other motivators might cause the user to be highly motivated to purchase the product. As with products presented via application of a specific StyleDNA 40, to purchase a product, a user clicks on the image 2142 associated with a product. The user is then taken to a detailed individual page associated with the product where the user is provided with a link to complete the purchase.

The method and system allows a user to develop multiple StyleDNA 40. A user is not limited to the StyleDNA 40 generated by the first playing of the StyleGame 20. The StyleGame 20 functionality is always accessible from the Manage StyleDNA page 530 and may be accessed by clicking the "RETAKE StyleGame" button 2502. Retaking the StyleGame 20 causes the system to interactively create and add a new StyleGame StyleDNA 41 to the user's profile. The new StyleGame StyleDNA 41 does not overwrite the user's previous StyleDNA 40.

Just as a user may select a StyleDNA 40 by hovering, a user may likewise elect to delete any StyleDNA 40 at any time by hovering over a StyleDNA 40 in the Manage StyleDNA page 530 and clicking the "x" that appears.

Brand Selection Criteria—In one aspect, the computer-implemented method and system causes specific brands to be selected for inclusion in the database based on one or more criteria. Exemplary criteria include a strong representation of style, an online brand presence, and products available for sale through an online retail channel. A strong representation of style is deemed the most important criterion. Other criteria are relevant in providing convenience to the user of the site by allowing well-represented brands to be easily purchased.

Input Management Method—Now, in additional detail, the method by which various inputs 105 are managed and used to generate StyleDNA 40 and other outputs 205 are described.

1. Dimension Mapping—First, style characteristics are determined for each item. For example, in one aspect, key elements identified for men's fashion are: (1) structure (sharpness, rigidity); (2) color combinations; (3) texture (material softness, thickness); (4) anchoring and supplemental accessories (such as hats, glasses, ties, shoes, belts, watches, and hair style); and (5) history/origin of the style. These style characteristics form a basis for the item/brand/content vector 93.

2. Inputs 105—To compare users to brands and lifestyle items, an n-dimensional user vector 92 is created for the user with n being the number of style dimensions used. In one aspect, the number of style dimensions used is nine. The user vector 92 is created by first having the user select lifestyle images from pre-determined categories that are strongly correlated to the style dimensions. Each lifestyle or brand image will have its own image vector 91. A variety of lifestyle elements and brands can be used for this purpose, but exemplary elements and brands from a preferred embodiment include Movies, Cars, Music/Bands, Magazines, Restaurants, Cities/Locations, Houses/Architecture, Lifestyle Items, Lifestyle Activities, and Alcohol Brands.

For example, in one aspect, the user is first shown nine images from popular movies. These images are representations or combinations of each of the nine style dimensions used for men's clothing. After selecting an image, the user is assigned the appropriate value(s) for those positions within an input array.

3. Outputs 205—The user vector 92 is subsequently compared to individual items and brands via one or more computer algorithms wherein the user vector 92 is correlated against the item/brand/content vector 93. The top matches are recommended to the user to allow for purchase, browsing, and comparison. At this point, the user can buy the items directly from the site or through pre-established affiliate networks via a referral system. The user can also be shown relevant brands, "looks", and outfits that map to his style.

The user may opt to perform additional actions such as: (1) liking/disliking items or brands; (2) browse other users "digital closets" who have purchased, searched or own items; (3) "follow" other users based on their choice of style; (4) make comments; on items/brands/other user profiles and make recommendations to others; (5) enter personal fit data and measurements, and add their favorite brands to their profile; (6) record comments regarding fit for particular items and brands; and (7) add items that they own or want to a digital closet that other users may view.

As the user goes through these actions, a secondary algorithm allows for simple additional recommendations such as "see items similar to this." These recommendations may be based on other user actions and provide an additional level of personalization.

Additionally, in another aspect, the system will evaluate the likelihood that an article of clothing will physically fit a user based on his profile information, and the fit data gathered from other users. For instance if a shirt is owned by user A, and user B has similar body type dimensions (from his profile), the system will indicate that it is likely that the shirt will also fit user B.

4. Computer-implemented Algorithms—Calculating the correlation between a user vector 92 and item/brand/content vectors 93 is performed using a computer processor. The correlation may be a computationally expensive process and, hence, in an alternative embodiment, the method and system benefits from application to flexible cloud computing infrastructure to allow rapid response. Although the operative algorithm implemented may be fundamentally direct, the processing of the algorithm to transform inputs 105 from a user into relevant outputs 205 and associated recommendations to the user, requires significant computational and storage overhead. Iterating on tens of thousands of items, including all dimensions of the vector 93 for each item or brand, creates a significant computational and storage overhead.

In another aspect, the results are cached. Where a user vector 92 may change over time and the number of possible image vectors 91 or item/brand/content vectors 93 can expand, another aspect incorporates preprocessing of all relevant vectors to expedite presentation of the output of those vectors to a user. Again, implementation of either of the cache or preprocessing will still benefit via implementation using a cloud infrastructure to allow access to computing and data storage resources as needed to ensure timely response to users.

In another aspect, the method and system supports preprocessing for a subset of possible vectors and approximating results based on these vectors. Thus, the method and system expedites the assessment through a large number of items to identify a smaller representative number for individual consideration.

Other algorithmic approaches may be used and implemented as features of the method and system, including matching on aligned dimensions.

Alternatively, an aspect of the method and system may be implemented without the requirement of approximating subsets. Instead, the system iterates across all matched items for every request, and then determines individual scores, avoiding an approximation approach.

Additionally, the method and system can leverage score lookup tables for each user. Such lookup tables are computationally intensive and require significant data storage space but would be applicable where the availability or cost of storage space is not a significant factor.

The method and system may also deploy a hybrid approach where actual user vectors 92 are clustered to provide feedback for refinement of the applicable algorithms used by the system to match user vectors 92 with item/brand/content vectors 93.

Further, in another aspect of the method and system, different data structures may be implemented. For example, data structures such as KD-trees will provide efficient lookups of "nearby" items, even in multiple dimensions. However, this data structure can be difficult to coordinate across the entire software stack. Hash tables are another alternative to support pre-computation of results to shorten lookup times. In another aspect, the method and system stores the scores in the database with the items, allowing a SQL query to use the scores for sorting. In this way, the score table acts roughly as a hash table would for the end user: acting simply as a reasonably efficient key-value store.

Figure 34:
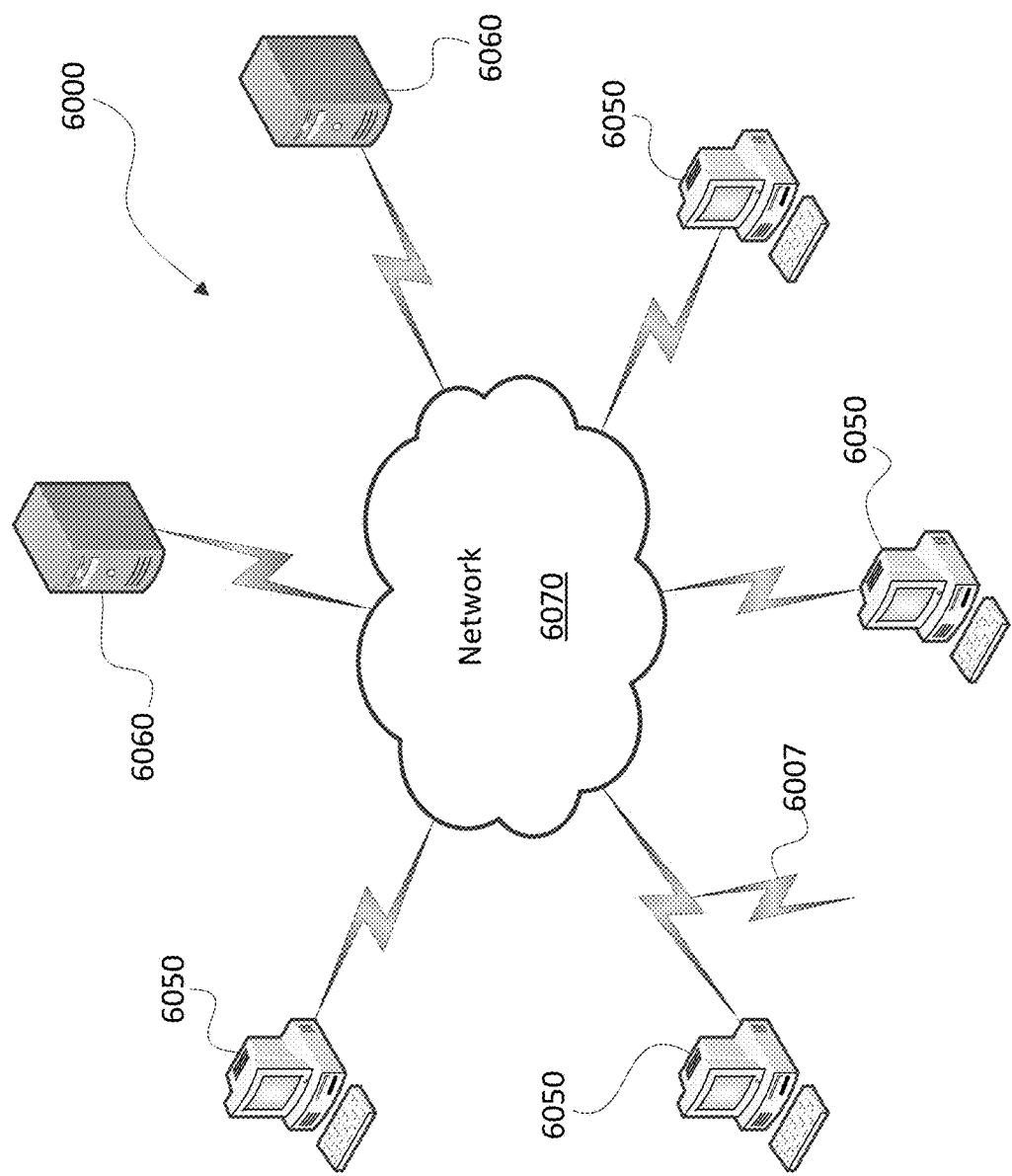
FIG. 34 is an illustration of a representative network used to implement the method and system embodying principles of the invention.

Processing Environment—Now referring to FIG. 34, the method and system is implemented across a global network, generally supported by the Internet and the World Wide Web. FIG. 34 illustrates a computer network or similar digital processing environment 6000 in which the method and system may be implemented. Client computer(s)/devices 6050 and server computer(s) 6060 provide processing, storage, and input/output devices executing application programs and the like. Client computer(s)/devices 6050 can also be linked through communications network 6070 to other computing devices, including other client devices/processes 6050 and server computer(s) 6060. Communications network 6070 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 35:
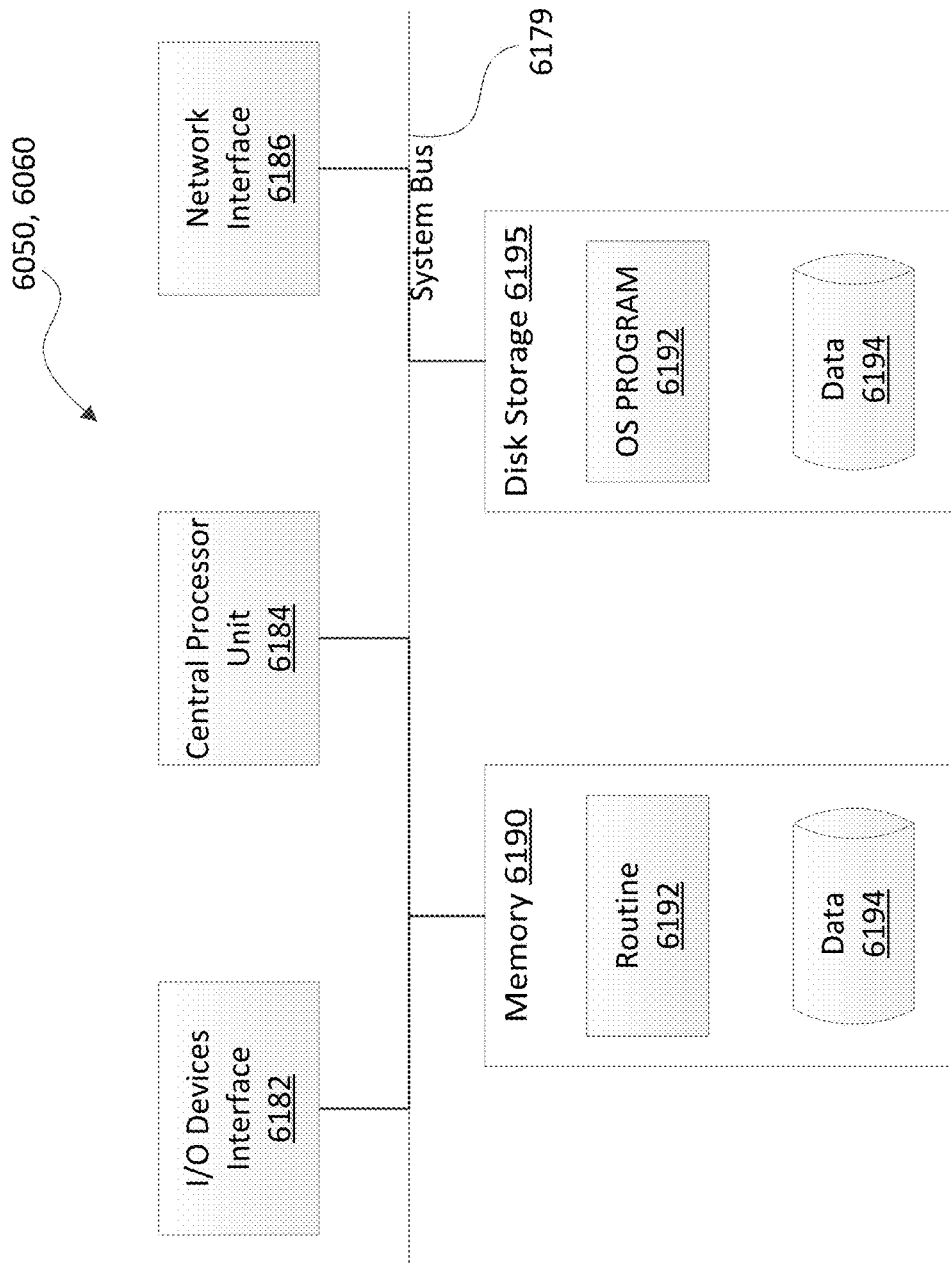
FIG. 35 is a block diagram for a representative computer system used to implement the method and system embodying principles of the invention.

FIG. 35 is a diagram of the internal structure of a computer (e.g., client processor/device 6050 or server computers 6060) in the computer system of FIG. 34. Each computer 6050, 6060 contains system bus 6179, where a bus is a set of hardware lines used for data transfer among the components of a computer or processing system. Bus 6179 is essentially a shared conduit that connects different elements of a computer system (e.g., processor, disk storage, memory, input/output ports, network ports, etc.) that enables the transfer of information between the elements. Attached to system bus 6179 is an Input/Output (I/O) device interface 6182 for connecting various input and output devices (e.g., keyboard, mouse, displays, printers, speakers, etc.) to the computer 6050, 6060. Network interface 6186 allows the computer to connect to various other devices attached to a network (e.g., network 6070 of FIG. 21). Memory 6185 provides volatile storage for computer software instructions 6192 and data 6194 used to implement an embodiment (e.g., object models, codec and object model library discussed above). Disk storage 6195 provides non-volatile storage for computer software instructions 6192 and data 6194 used to implement an embodiment. Central processor unit 6184 is also attached to system bus 6179 and provides for the execution of computer instructions.

In one aspect, the processor routines 6192 and data 6194 are a computer program product, including a computer readable medium (e.g., a removable storage medium, such as one or more DVD-ROM's, CD-ROM's, diskettes, tapes, hard drives, etc.) that provides at least a portion of the software instructions for the method and system. Computer program product can be installed by any suitable software installation procedure, as is well known in the art. In another embodiment, at least a portion of the software instructions may also be downloaded over a cable, communication and/or wireless connection. In other embodiments, the method and system programs are a computer program propagated signal product embodied on a propagated signal on a propagation medium 6007 (e.g., a radio wave, an infrared wave, a laser wave, a sound wave, or an electrical wave propagated over a global network, such as the Internet, or other network(s)). Such carrier medium or signals provide at least a portion of the software instructions for the routines/program 6192.

In alternate aspects, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a certain time period, such as the instructions for a software application sent in packets over a network over a period of milliseconds, seconds, minutes, or longer. In another embodiment, the computer readable medium of computer program product is a propagation medium that the computer system may receive and read, such as by receiving the propagation medium and identifying a propagated signal embodied in the propagation medium, as described above for computer program propagated signal product.

The term "carrier medium" or transient carrier encompasses the foregoing transient signals, propagated signals, propagated medium, storage medium and the like.

While numerous aspects and embodiments of the inventive subject matter have been particularly shown and described with references to specific elements or features thereof, it will be understood by those skilled in the art that various changes in form and details may be made therein without departing from the scope of the inventive subject matter encompassed by the appended claims.

For example, the method and system may be implemented in a variety of computer architectures. The computer network of FIG. 34 and FIG. 35 is for purposes of illustration and not limitation of the inventive subject matter.

As contemplated herein, various aspects and embodiments of the inventive subject matter can take the form of an entirely hardware embodiment, an entirely software embodiment or an embodiment containing both hardware and software elements. In one embodiment, the inventive subject matter is implemented in software, which includes but is not limited to firmware, resident software, microcode, and other forms.

Furthermore, embodiments of the inventive subject matter can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Some examples of optical disks include compact disc-read only memory (CD-ROM), compact disc read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code are retrieved from bulk storage during execution.

Input/output or I/O devices (including but not limited to keyboards, displays, pointing devices, touch screens, gesture recognition interfaces, smart phones, kiosks, RFID identifiers, smart cards, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Thus, specific compositions and methods of the computer-implemented method and system for recommendation system input management have been disclosed. It should be apparent, however, to those skilled in the art that many more modifications besides those already described are possible without departing from the inventive concepts herein. The inventive subject matter, therefore, is not to be restricted except in the spirit of the disclosure.

Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

We claim:

1. A method for execution by a computing device for managing inputs in a recommendation system comprising:
   receiving, by the computing device, a request from a user computing device to begin a visual selection game module, wherein the user computing device is associated with a user profile;
   generating, by the computing device, one or more selectable image groups for display on a display of the user computing device, wherein the one or more selectable image groups include one or more selectable images from one or more image databases;
   receiving, by the computing device, a selection of one or more images from the one or more selectable image groups;
   generating, by the computing device, a populated image matrix based on the selection of the one or more images;
   generating, by the computing device, a preliminary input vector from the populated image matrix;
   generating, by the computing device, a personal preference profile for the user profile based upon the preliminary input vector;
   determining, by the computing device, to correlate one or more databases of items based on the personal preference profile for the user profile; and
   generating, by the computing device, a representation of one or more correlated items of the correlated one or more database of items; and
   sending, by the computing device, the representation of the one or more correlated items to the user computing device for displaying on the display.

2. The method of claim 1 further comprises: saving the personal preference profile, wherein the saved personal preference profile is able to be one or more of subsequently utilized and modified.

3. The method of claim 1 further comprises: generating a web interface for interaction with the recommendation system, wherein the web interface includes one or more of:
   a manage page;
   an explore page;
   a buy page; and
   a brands page.

4. The method of claim 3, wherein the manage page supports additional interaction associated with the user profile, wherein the additional interaction includes one or more of:
   renaming existing personal preference profiles;
   creating a new personal preference profile;
   modifying existing personal preference profile;
   deleting one or more personal preference profiles;
   placing images of interest in a designated image holding area;
   retaking the visual selection game module;
   identifying a currently active personal preference profile;
   browsing personal preference profiles of other user profiles;
   importing personal preference profiles of other user profiles; and
   viewing personal preference profiles created and publicly shared by other user profiles.

5. The method of claim 4 further comprises: modifying an existing personal preference profile by substituting an image of the selected one or more images with another image selected from the one or more selectable image databases; the system thereby dynamically creating an updated corresponding preliminary input vector to overwrite an existing preliminary input vector and saving the modified personal preference profile to the user's account profile.

6. The method of claim 5, wherein the one or more images are selectable from one or more of:
   images in the designated image holding area; and
   images deleted from the designated image holding area.

7. The method of claim 4, wherein the explore page supports additional interaction associated with the user profile, wherein the additional interaction includes one or more of:
   displaying items related to the currently active personal preference profile;
   adding items to the designated image holding area;
   displaying additional detail for a selected item via an item detail page;
   adding any item viewable in the item detail page to the holding area; and
   selecting a product viewable on the item detail page for purchase.

8. The method of claim 3 wherein the buy page includes interactive functionality associated with the user profile, wherein the interactive functionality includes one or more of:
- displaying product items available for purchase based on the personal preference profile;
- adding an item to the user's holding area;
- clicking an item on the buy page invoking a view product selection detail function and displaying a full product detail page; and
- selecting a view brand page link to view a web page associated with the particular brand of the selected product.

9. The method of claim 8, wherein the interactive functionality further comprises:
- displaying other content associated with an individual full product detail page based on receiving a selection input via displayed related articles on the individual full product detail page, wherein the related articles are displayed based on one or more criteria including style similarity, user profile interests and lifestyle preferences.

10. The method of claim 8, wherein the individual full product detail page includes a complete the look function wherein the personal preference profile for the user is applied to identify one or more correlated items deemed to complement the specific product under review by the user profile.

11. The method of claim 1 further comprises: prior to the sending, applying one or more filters to the one or more correlated items.

12. The method of claim 1, wherein each correlated item of the one or more correlated items is selected independent of vendor-centric sales preferences in favor of user-profile centric preferences or personal preference profiles.

13. The method of claim 1, wherein a vendor filter is applied to the one or more correlated items, wherein the vendor filter causes the computing device to only include items sourced from one or more specific vendors in the representation of the one or more correlated items.

14. The method of claim 1 further comprises:
- determining a brand filter; and
- applying the brand filter to the one or more correlated items based on one or more of:
  - a strong representation of style criteria associated with a brand;
  - online presence criteria associated with the brand; and
  - products available for sale through an online retail channel criteria associated with the brand.

* * * * *